(12) United States Patent
Brocklebank

(10) Patent No.: US 7,171,340 B2
(45) Date of Patent: Jan. 30, 2007

(54) COMPUTER-IMPLEMENTED REGRESSION SYSTEMS AND METHODS FOR TIME SERIES DATA ANALYSIS

(75) Inventor: John C. Brocklebank, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 11/119,670

(22) Filed: May 2, 2005

(65) Prior Publication Data

US 2006/0247900 A1 Nov. 2, 2006

(51) Int. Cl.
*G06F 3/01* (2006.01)
(52) U.S. Cl. .............. 702/189; 702/183; 702/190; 702/196
(58) Field of Classification Search .............. 702/84, 702/104, 181, 183, 190, 191, 189; 700/29; 704/201, 228; 706/22
See application file for complete search history.

(56) References Cited

U.S. PATENT DOCUMENTS

| | | | |
|---|---|---|---|
| 5,701,395 A | 12/1997 | Stuckman et al. | 706/25 |
| 5,748,508 A | 5/1998 | Baleanu | 702/13 |
| 6,611,726 B1 | 8/2003 | Crosswhite | 700/99 |
| 6,625,569 B2 * | 9/2003 | James et al. | 702/183 |
| 6,954,745 B2 * | 10/2005 | Rajan | 706/22 |
| 6,985,779 B2 * | 1/2006 | Hsiung et al. | 700/19 |
| 2004/0073475 A1 | 4/2004 | Tupper | 705/10 |

* cited by examiner

*Primary Examiner*—Marc S. Hoff
*Assistant Examiner*—Felix Suarez
(74) *Attorney, Agent, or Firm*—Jones Day

(57) ABSTRACT

Computer-implemented systems and methods for analyzing time series data. Statistical techniques are performed upon candidate autoregressive components and regressor components using the time series data. Autoregressive and regressor components are included in a predictive model based upon the autoregressive and regressor components' significance levels as determined by the statistical techniques.

20 Claims, 14 Drawing Sheets

COMPUTER-IMPLEMENTED REGRESSION SYSTEMS AND METHODS FOR TIME SERIES DATA ANALYSIS

TECHNICAL FIELD

This document relates generally to computer-implemented time series data analysis and more particularly to computer-implemented analysis of time series data using regression analysis.

BACKGROUND

Classical stepwise regression techniques have found favor in applications where the numbers of inputs, independent variables, or exogenous variables are extremely large and their measurable effect on the target and other inputs are unmanageable to measure. Classical statistics teaches that the targets should be plotted versus the inputs, the inputs versus other inputs and the correlation statistics. Some theorists suggest that one should have a solid understanding of the dynamics of the process and then force this known structure through a functionally efficient modeling environment.

However such techniques can be cumbersome and resource intensive to use, such as, for example, in studying Direct to Consumer (DTC) advertising in the pharmaceutical industry. Pharmaceutical campaigns, with expenditures for a given brand reaching well over several million dollars per month, could include: TV through gross rating points, printed matter, computer banners, radio exposure, etc. Characterizing the different factors through the approaches described above could result in a table with over 500 columns that define advertising expenditures and exposures. An analysis of 500 input columns evaluated 2 at a time results in over 124,750 comparisons. The situation may be even more difficult in that the data is collected daily and is highly autocorrelated. A complete and rigorous statistical analysis could take many days or weeks.

SUMMARY

In accordance with the teachings provided herein, systems and methods for operation upon data processing devices are provided in order to overcome one or more of the aforementioned disadvantages or other disadvantages concerning time series data analysis. As an example, a system and method can be configured to automatically measure and adjust for autocorrelation effects for a predictive model.

As another example, statistical techniques are performed upon candidate autoregressive components and regressor components using time series data. Autoregressive and regressor components are included in the parametric model based upon the autoregressive and regressor components' significance levels determined by the statistical techniques.

As yet another example, a system and method can be configured to determine a parametric model. Time series data is received. A statistical technique is performed upon autoregressive components using the time series data, and the significance level of an autoregressive component is determined. A statistical technique is also performed upon regressor components using the time series data, and the significance level of a regressor component is determined. The autoregressive and regressor components are included in the parametric model based upon the autoregressive and regressor components' significance levels. The resulting parametric model is a predictive model of the time series data and adjusts for autocorrelation in the time series data.

DETAILED DESCRIPTION

Figure 1:
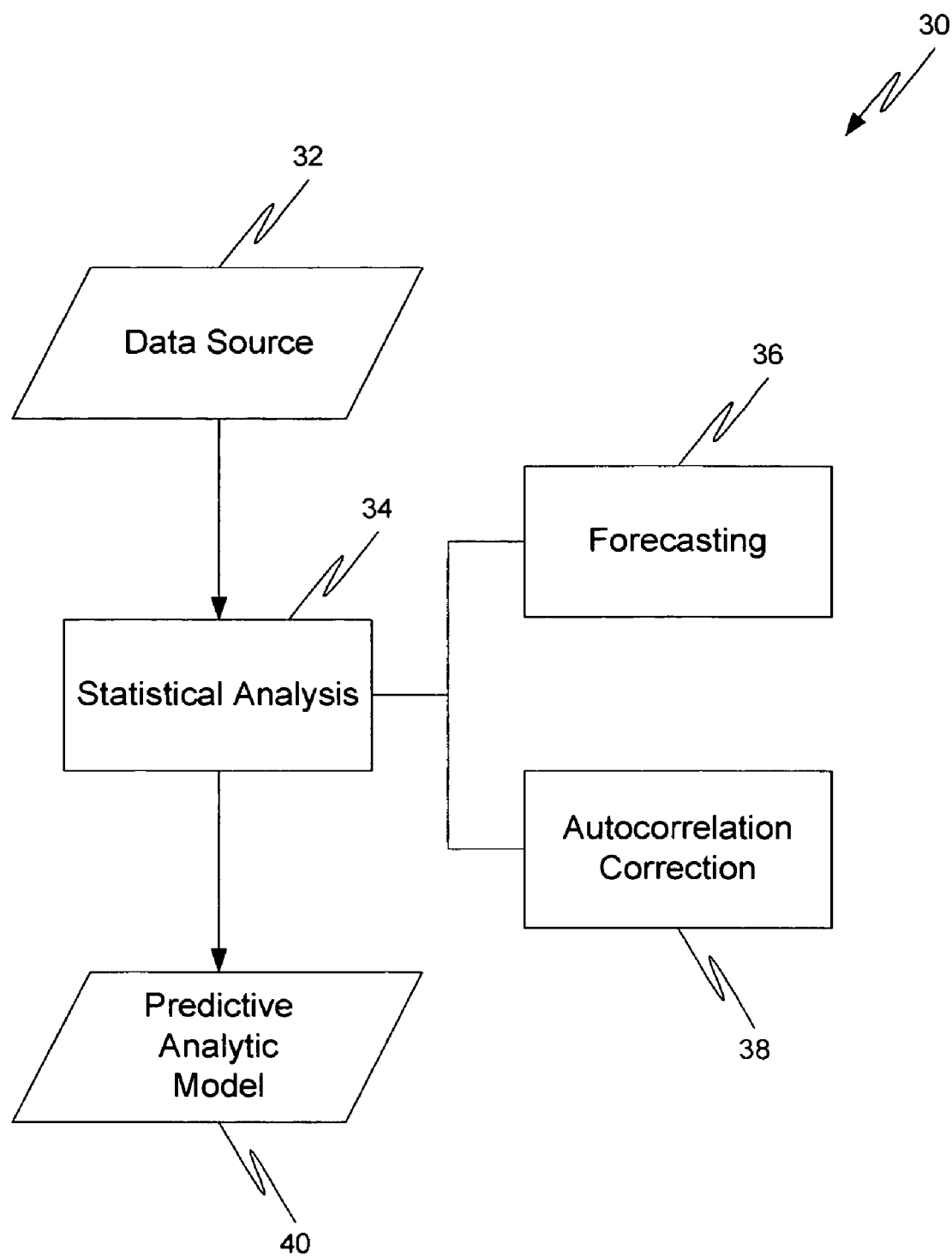
FIG. 1 is a block diagram depicting software and computer components utilized in analyzing time series data.

FIG. 1 depicts at 30 a system containing software and computer components for use in analyzing time series data received from a data source 32. The system 30 uses a statistical analysis program 34 to analyze the time series data. The statistical analysis program 34 includes forecasting functionality 36 to determine, among other things, coefficient values of variables used as predictors of the received time series data (and any other data which may be part of the analysis).

In addition to forecasting functionality 36, the statistical analysis module 34 uses (e.g., has access to) autocorrelation functionality 38 in order to perform regression techniques under a framework that measures and adjusts for autocorrelation in the time series data. Because of the forecasting and autocorrelation correction operations, the system 30 can generate a model 40 that not only is a predictor of the received time series data, but also can account for autocorrelation effects. It is noted that autocorrelation can be considered as the correlation (relationship) between members of a time series of observations, such as weekly share prices or interest rates, and the same values at a particular (e.g., fixed) time interval later.

Figure 2:
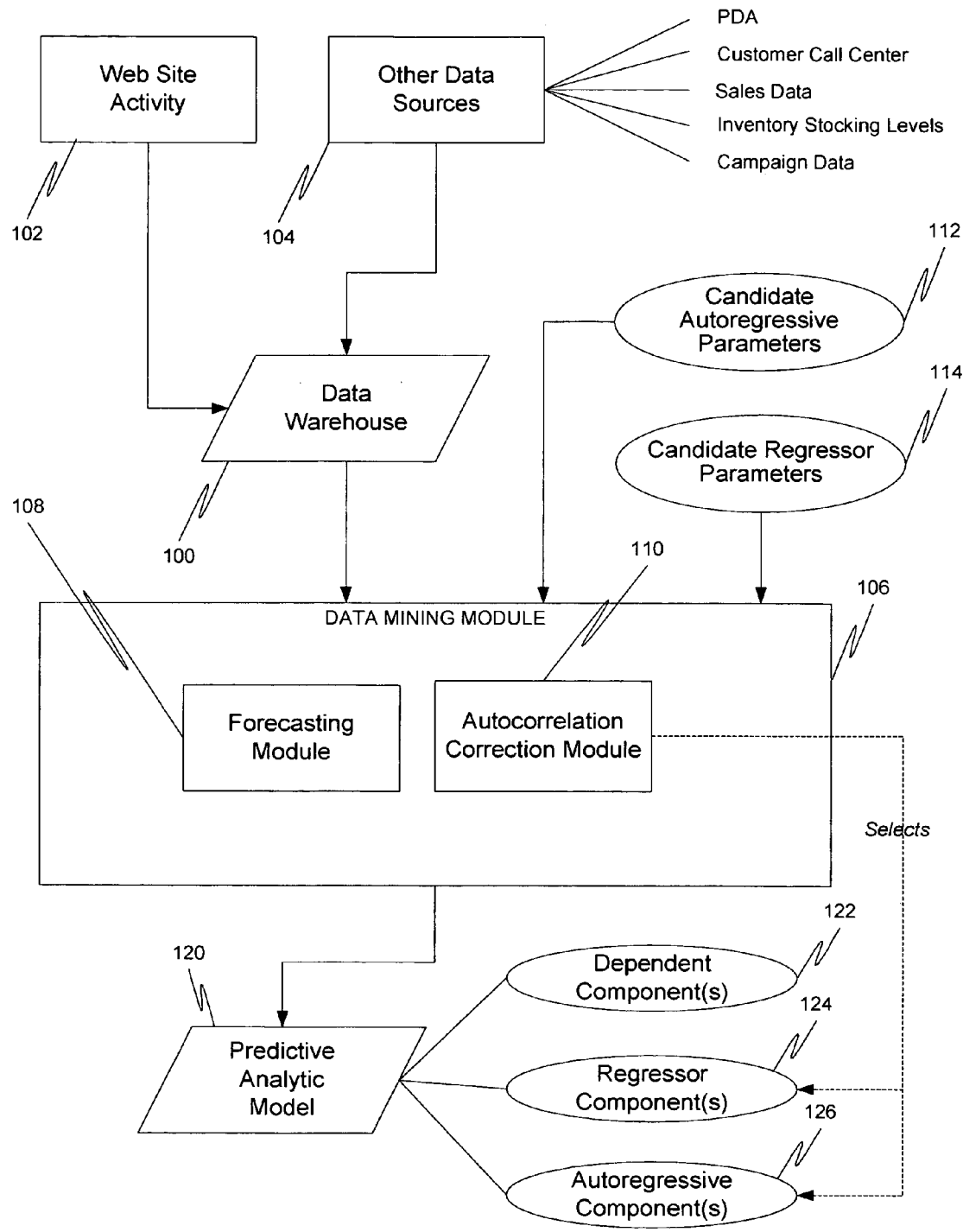
FIG. 2 is a block diagram depicting an example application wherein time series data is analyzed.

Such a system can be used in many different applications, such as the applications illustrated in FIG. 2. With reference to FIG. 2, a data warehouse 100 can store time series data related to web site activity 102. It should be understood that the data warehouse 100 could also store instead of or in addition to such data other types of time series data, such as time series data related to personal digital assistant (PDA) activity, customer call center activity, etc. (104).

A data mining module 106 receives the time series data from the data warehouse 100 that is to be analyzed. To generate a model 120 that can accurately act as a predictor of the time series data, the data mining module 106 includes a forecasting module 108 and an autocorrelation correction module 110. It should be understood that two modules are shown in FIG. 2, but the software instructions used to implement forecasting operations and autocorrelation correction operations may be placed in the same or different computer program depending upon the situation at hand.

Using the autocorrelation correction module 110, the data mining module 106 can automatically select from a candidate set of autoregressive components 112 and regressor components 114 which autoregressive components (if any) or regressor components (if any) should be used in the predictive analytic model 120. From the selected autoregressive components and regressor components, the forecasting module 108 builds the predictive analytic model, such as by determining the model's variable coefficient values.

A predictive analysis model 120 can be constructed with many different types of components, such as with dependent component(s) 122, regressor component(s) 124, autoregressive component(s) 126, etc. For example, a model with autocorrelated disturbances could resemble the following:

$$y_t = x'_t \beta + v_t$$

$$v_t = \rho_1 v_{t-1} + \rho_2 v_{t-2} + \ldots + \rho_p v_{t-p} + \epsilon_t$$

$$\epsilon_t \sim N(0, \sigma^2)$$

In these equations, $y_t$ are the dependent or target values, $x_t$ is a column vector of regressor or input variables plus a column of 1's corresponding to the mean or intercept, $\beta$ is a column vector of structural parameters, and $\epsilon_t$ is normally and independently distributed with a mean of 0 and a variance of $\sigma^2$.

To illustrate selection of autoregressive and regressor parameters from candidate pools 112 and 114, the data mining module 106 can define the model's components as follows: Let $\rho = (\rho_1, \rho_2, \ldots, \rho_p)'$
and let the variance matrix of the errors vector $v = (v_1, \ldots, v_p)'$ be $\Sigma E(vv') = \Sigma = \sigma^2 V$ If the vector of autoregressive parameters $\rho$ is known, the matrix V can be computed from the autoregressive parameters.

The transformed error, e, can be defined as:
$$e = L^{-1} n \text{ where}$$

$$n = y - X\beta \text{ and}$$

L denotes the Cholesky root of V, that is $$V = LL' \text{ with L lower triangular.}$$

For an AR(p) model, $L^{-1}$ is a banded diagonal matrix, with m anomalous rows at the beginning and the autoregressive parameters along the remaining rows.

The unconditional sum of squares for the model S is:
$$S = n'V^{-1}n = e'e$$

The full log likelihood function for the autoregressive error model is $$l = -\frac{N}{2}\ln(2\pi) - \frac{N}{2}\ln(\sigma^2) - \frac{1}{2}\ln(|V|) - \frac{S}{2\sigma^2}$$

where |V| denotes the determinant of V and N the sample size. For the maximum likelihood method, the likelihood function is maximized by minimizing an equivalent sum of squares function.

Maximizing l with respect to $\sigma^2$ (and concentrating $\sigma^2$ out of the likelihood) and dropping the constant term $$-\frac{N}{2}[\ln(2\pi) + 1 - \ln(N)]$$

produces the concentrated log likelihood function $$l_c = -\frac{N}{2}\ln(S|V|^{1/N})$$

Rewriting the terms within the logarithm gives:

$$S_{pl} = |L|^{1/N} e'e |L|^{1/N}$$

The Maximum Likelihood estimates can be obtained by minimizing the objective function:

$$S_{pl} = |L|^{1/N} e'e |L|^{1/N}$$

The Gauss-Marquardt algorithm may be used to minimize the sum of squares and maximize the log likelihood, respectively. Optimization can be performed simultaneously for both the regression $\beta$ and autoregressive $\rho$ parameters. The ordinary least squares estimates of $\beta$ and the Yule-Walker estimates of $\rho$ can be used as starting values.

For the Maximum Likelihood method, a joint variance-covariance matrix of all the regression $\hat{\beta}$ and autoregressive parameter estimates $\hat{\rho}$ is computed. This allows for the calculation of t-Ratios and approximate probabilities. The approximate probabilities can be used to determine whether the parameters are statistically significant or statistically different from 0.

Once the regressor variables are chosen, significance testing can be first deployed on the autoregressive parameters $\hat{\rho}$ followed by significance testing on the regression parameters $\hat{\beta}$. Based upon the testing of the autoregressive parameters and regression parameters from pools 112 and 114, the data mining module 110 can select the regression parameters and autoregressive parameters that should be used by the forecasting module 108 to complete construction of the predictive analytic model 120.

Figure 3:
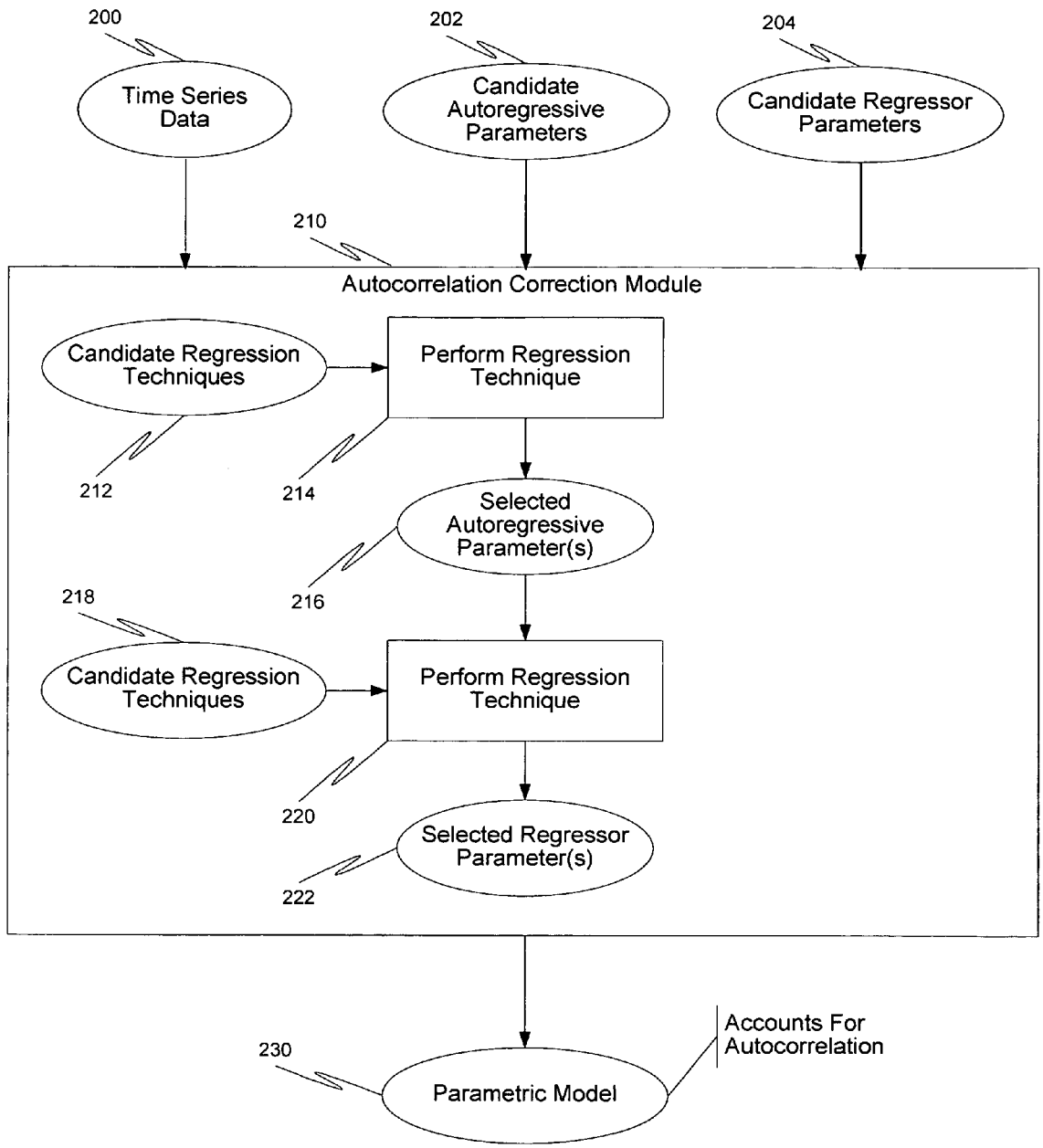
FIG. 3 is a block diagram depicting multiple regression techniques being used to select regressor and autoregressive components.

FIG. 3 illustrates use of multiple regression techniques (214, 220) to select autoregressive parameter(s) 216 and regressor parameter(s) 222. The autocorrelation module 210 can perform one or more candidate regression techniques (212, 218) for determining which parameters (216, 222) should be used in generating a parametric model 230 that accounts for autocorrelation.

Stepwise regression selection method 214 is performed on the candidate autoregressive parameters 202, and stepwise regression selection method 220 is then applied to the regressor candidate parameters 204. As an illustration of candidate parameters, consider the case of seasonal monthly time series data, wherein up to 13 autoregressive parameters (seasonal periodicity 12 plus one) corresponding to lags one through 13 could be used as input to an autocorrelation correction module 210.

The regression techniques (214, 220) can use many different types of candidate regression techniques (212, 218) to evaluate the candidate parameters (202, 204). Examples of candidate regression techniques may include a forward selection technique, a backward elimination technique, a forward-selection with changes technique, etc.

A forward selection technique begins with no regressors/autoregressive terms in the model. For each term, a forward selection technique calculates t-Ratios that reflect the terms contribution to the model if it is included. The p-values for these t-Ratios are compared to the significance level for entry. This can be set to any value between 0 and 1 (e.g., 0.5). If no t-Ratio has a significance level less than the significance level for entry value, the forward selection technique stops. Otherwise, the forward selection technique adds the term that has the largest t-Ratio to the model. The forward selection technique then calculates the t-Ratios again for the terms still remaining outside the model, and the evaluation process is repeated. Thus, terms are added one by one to the model until no remaining terms produce significant t-Ratios. Terms will be allowed to enter and leave since the forward selection technique is being applied to the regressors after being applied to the autoregressive parameters. Once a regressor variable is in the model, it stays there. Since the autoregressive parameters are reevaluated after each change in the regressor variable, they may change.

A backward elimination technique begins by calculating statistics for a model, including all of the terms (regressors or autoregressive parameters). Then the terms are deleted from the model one by one until all the terms remaining in the model produce t-Ratios significant at the significance level for stay. The significance level for stay value can be set to any value between 0 and 1. As an example, a significance level for stay value can be set to 0.10. At each step, the term showing the smallest contribution to the model is deleted.

A forward-selection with changes technique is a modification of the forward selection technique and differs in that regressor variables and autoregressive parameters already in the model do not necessarily stay there. As in the forward selection method, terms are added one at a time to the model, and the t-Ratio for a term to be added is significant at the significance level for entry. After a variable is added, the forward-selection with changes method looks at all the variables already included in the model and deletes any variable that does not produce t-Ratios significant at the significance level for stay level. After this check is made and the necessary deletions accomplished, another variable can be added to the model. The forward-selection with changes process ends when none of the variables outside the model has a t-Ratio significant at the significance level for entry and every variable in the model is significant at the significance level for stay or when the variable to be added to the model is the one just deleted from it. Settings for significance level for entry and significance level for stay for the forward-selection with changes method could both be 0.15.

An autocorrelation correction module 210 can use one or more of the candidate regression techniques (212, 218) to select from the candidate autoregressive parameters 202 and candidate regressor parameters 204. As a result, multiple parametric models can be generated automatically by using different permutations of the candidate regression techniques (212, 218) upon the candidate autoregressive components and the regressor components (202, 204). For example if three techniques are used for each regression (214, 220), then permutations of the three techniques result in a total of nine different ways for determining which candidate parameters should be selected—that is, three methods for the autoregressive terms and three methods for the regressor variables.

Figure 4:
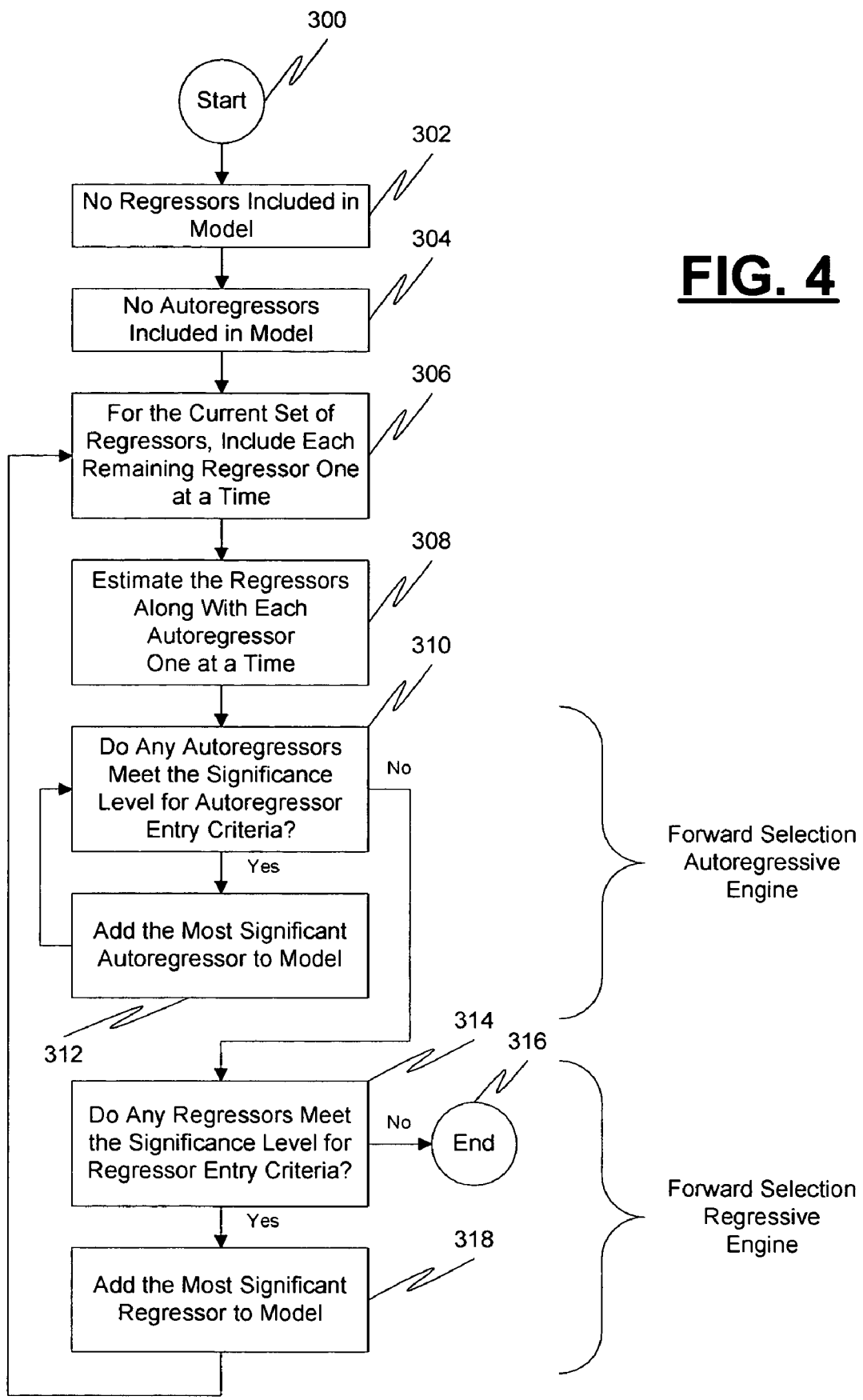
FIG. 4 is a flowchart illustrating an operational scenario wherein a forward selection technique is used to select one or more autoregressors and a forward selection technique is used to select one or more regressors.

FIG. 4 illustrates an operational scenario wherein a forward selection technique is used to select one or more autoregressors and a forward selection technique is used to select one or more regressors. With reference to FIG. 4, start block 300 indicates that at block 302, the model initially begins with no regressors. Block 304 indicates that no autoregressors are included in the model.

Process block 306 iteratively processes each candidate regressor that is supplied by a user or some other source (e.g., a computer program). For the current set of candidate regressors, each regressor is processed one at a time as follows. At process block 308, the regressors are estimated along with each autoregressors one at a time. Process block 310 examines whether any autoregressors meet a predetermined significance level for the autoregressors entry criteria. If no autoregressors meet the significance level, then processing continues at process block 314. However if one or more autoregressors do meet the significance level, then process block 312 adds the most significant autoregressor to the model. Processing then returns to process block 310 in order to a evaluate whether there are any other remaining autoregressors that do satisfy the significance level. If there are no such autoregressors as determined by process block 310, then processing continues at process block 314.

Process block 314 examines whether any regressors meet the significance level for a regressor entry criteria. If no regressors meet the significance level, then processing for this operational scenario terminates at end block 316. However if there are one or more regressors that meet the significance level, then process block 318 adds the most significant regressor to the model. Processing resumes at process block 306 in order to evaluate the next regressor in the current set of candidate regressors.

It should be understood that similar to the other processing flows described herein, the steps and the order of the steps in the flowchart described may be altered, modified, removed and/or augmented and still achieve the desired outcome. Also, the steps may be implemented by one or more software programs. For example, process blocks 310 and 312 may be performed by a forward selection autoregressive software program engine, while process blocks 314 and 318 may be performed by a forward selection regressive software program engine.

As another example of a forward selection technique being used to select one or more regressors and a forward selection technique being used to select one or more autoregressors, the following is provided. In this example, the following is assumed: Regressors (X1, X2, X3) and Autoregressors (P1, P2, P3).

Estimate the following to check X1 autoregressors:
X1 P1.
X1 P2.
X1 P3.
Most significant autoregressor=X1 P2.
Does it meet entry requirement=Yes.

Estimate the following to check X1 P2 autoregressors:
X1 P2 P1.
X1 P2 P3.
Most significant autoregressor=X1 P2 P3.
Does it meet entry requirement=Yes.

Estimate the following to check X1 P2 P3 autoregressors:
X1 P2 P3 P1.
Most significant autoregressor=X1 P2 P3 P1.
Does it meet entry requirement=No.
Best X1 Model=X1 P2 P3.

Estimate the following to check X2 autoregressors:
X2 P1.
X2 P2.
X2 P3.
Most significant autoregressor=X2 P2.
Does it meet entry requirement=Yes.

Estimate the following to check X2 P2 autoregressors:
X2 P2 P1.
X2 P2 P3.
Most significant autoregressor=X2 P2 P1.
Does it meet entry requirement=Yes.

Estimate the following to check X2 P2 P1 autoregressors:
X2 P2 P1 P3.
Most significant autoregressor=X2 P2 P1 P3.
Does it meet entry requirement=No.
Best X2 Model=X2 P2 P1.

Estimate the following to check X3 autoregressors:
X3 P1.
X3 P2.
X3 P3.
Most significant autoregressor=X3 P2.
Does it meet entry requirement=No.
Best X3=X3.

Estimate the following to check regressor:
X1 P2 P3.
X2 P2 P1.
X3.
Most significant regressor=X2.
Does X2 meet entry requirement=Yes.
Add X2 to model.

Estimate the following to check X2 X1 autoregressors:
X2 X1 P1.
X2 X1 P2.
X2 X1 P3.
Most significant autoregressor=X2 X1 P2.
Does it meet entry requirement=Yes.

Estimate the following to check X2 X1 P2 autoregressors:
X2 X1 P2 P1.
X2 X1 P2 P3.
Most significant autoregressor=X2 X1 P2 P3.
Does it meet entry requirement=No.
Best X2 X1 model=X2 X1 P2.

Estimate the following to check X2 X3 autoregressors:
X2 X3 P1.
X2 X3 P2.
X2 X3 P3.
Most significant autoregressor=X2 X3 P1.
Does it meet entry requirement=Yes.

Estimate the following to check X2 X3 P1 autoregressors:
X2 X3 P1 P2.
X2 X3 P1 P3.
Most significant autoregressor=X2 X3 P1 P3.
Does it meet entry requirement=Yes.

Estimate the following to check X2 X3 P1 P3 autoregressors:
X2 X3 P1 P3 P2.
Most significant autoregressor=X2 X3 P1 P3 P2.
Does it meet entry requirement=No.

Best X2 X3 model=X2 X3 P1 P3.

Estimate the following to check regressor:
X2 X1 P2.
X2 X3 P1 P3.
Most significant X2 regressor=X3.
Does X3 meet entry requirement=Yes.
Add X3 to model.

Estimate the following to check X2 X3 X1 autoregressors:
X2 X3 X1 P1.
X2 X3 X1 P2.
X2 X3 X1 P3.
Most significant autoregressor=X2 X3 X1 P2.
Does it meet entry requirement=Yes.

Estimate the following to check X2 X3 X1 P2 autoregressors:
X2 X3 X1 P2 P1.
X2 X3 X1 P2 P3.
Most significant model=X2 X3 X1 P2 P3.
Does it meet entry requirement=No.

Estimate the following to check regressor:
X2 X3 X1 P2.
Most significant X2 X3 regressor=X1.
Does X1 meet entry requirement=No.
Do not add X1 to model.

Based upon the aforementioned analysis, the model includes the following selected regressors and autoregressors=X2 X3 P1 P3.

Figure 5:
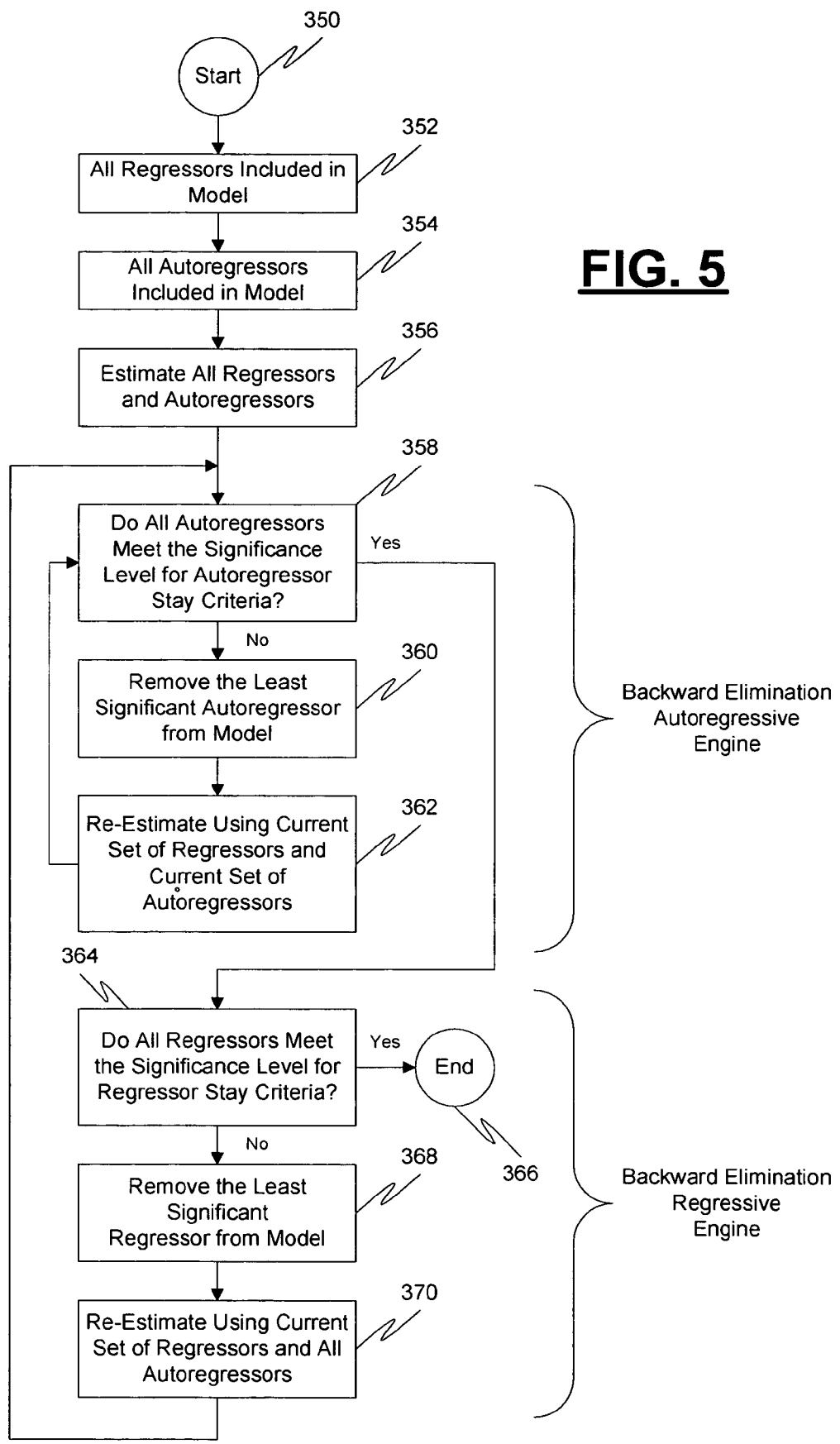
FIG. 5 is a flowchart illustrating an operational scenario wherein a backward elimination technique is used to select one or more autoregressors and a backward elimination technique is used to select one or more regressors.

FIG. 5 illustrates an operational scenario wherein a backward elimination technique is used to select one or more autoregressors and a backward elimination technique is used to select one or more regressors. With reference to FIG. 5, start block 350 indicates that at block 352, the model initially begins with all candidate regressors. Block 354 indicates that all autoregressors are included in the model.

Process block 356 indicates that an estimation is performed for all candidate regressors and autoregressors. Based upon the estimation performed by process block 356, process block 358 examines whether all autoregressors satisfy the significance level for the autoregressor stay criteria. If all autoregressors meet the significance level, then processing continues at process block 364. However if not all autoregressors meet the significance level, then processing continues at process block 360 wherein the least significant autoregressor is removed from the model. Process block 362 then performs another estimation using the current set of regressors in the current set of autoregressors (e.g., without the least significant autoregressor that was removed at process block 360). Processing then returns to process block 358. Using the estimation performed by process block 362, process block 358 examines whether all the autoregressors satisfy the significance level. If not all autoregressors meet the significance level, then processing continues at process block 360. However if all autoregressors do meet the significance level, then processing continues at process block 364.

The process block 364 examines whether all regressors meet the significance level for the regressors stay criteria. If all regressors satisfy the significance level, then processing for this operational scenario terminates at end block 366. However if not all regressors meet the significance level, then processing continues at process block 368. Process block 368 removes the least significant regressor from the model. Process block 370 performs an estimation using the current set of regressors and all of the autoregressors that were selected as satisfying the significance level at process block 358. Processing continues at process block 358 which uses the estimation performed at process block 370 in order to examine whether all autoregressors meet the significance level. Processing continues until all of the selected regressors meet the significance level for the regressor stay criteria as determined by process block 364.

As another example of a backward elimination technique being used to select one or more autoregressors and a backward elimination technique being used to select one or more regressors, consider the following. In this example, the following is assumed: Regressors (X1, X2, X3) and Autoregressors (P1, P2, P3).

Estimate the following to check X1 X2 X3 autoregressors:
X1 X2 X3 P1 P2 P3.
Least significant autoregressor=P2.
Does it meet stay requirement=No.

Estimate the following to check X1 X2 X3 autoregressors:
X1 X2 X3 P1 P3.
Least significant autoregressor=P3.
Does it meet stay requirement=Yes.
Best X1 X2 X3 Model=X1 X2 X3 P1 P3.

Estimate the following to check regressors:
X1 X2 X3 P1 P3.
Least significant regressor=X1.
Does it meet stay requirement=No.
Delete X1 from model.

Estimate the following to check X2 X3 autoregressors:
X2 X3 P1 P2 P3.
Least significant autoregressor=P1.
Does it meet stay requirement=No.

Estimate the following to check X2 X3 autoregressors:
X2 X3 P2 P3.
Least significant autoregressor=P3.
Does it meet stay requirement=Yes.
Best X2 X3 Model=X2 X3 P2 P3.

Estimate the following to check regressors:
X2 X3 P2 P3.
Least significant term=X2.
Does it meet stay requirement=Yes.
Keep X2 in model.

Based upon the aforementioned analysis, the model includes the following selected regressors and autoregressors: X2, X3, P2, and P3.

Figure 6:
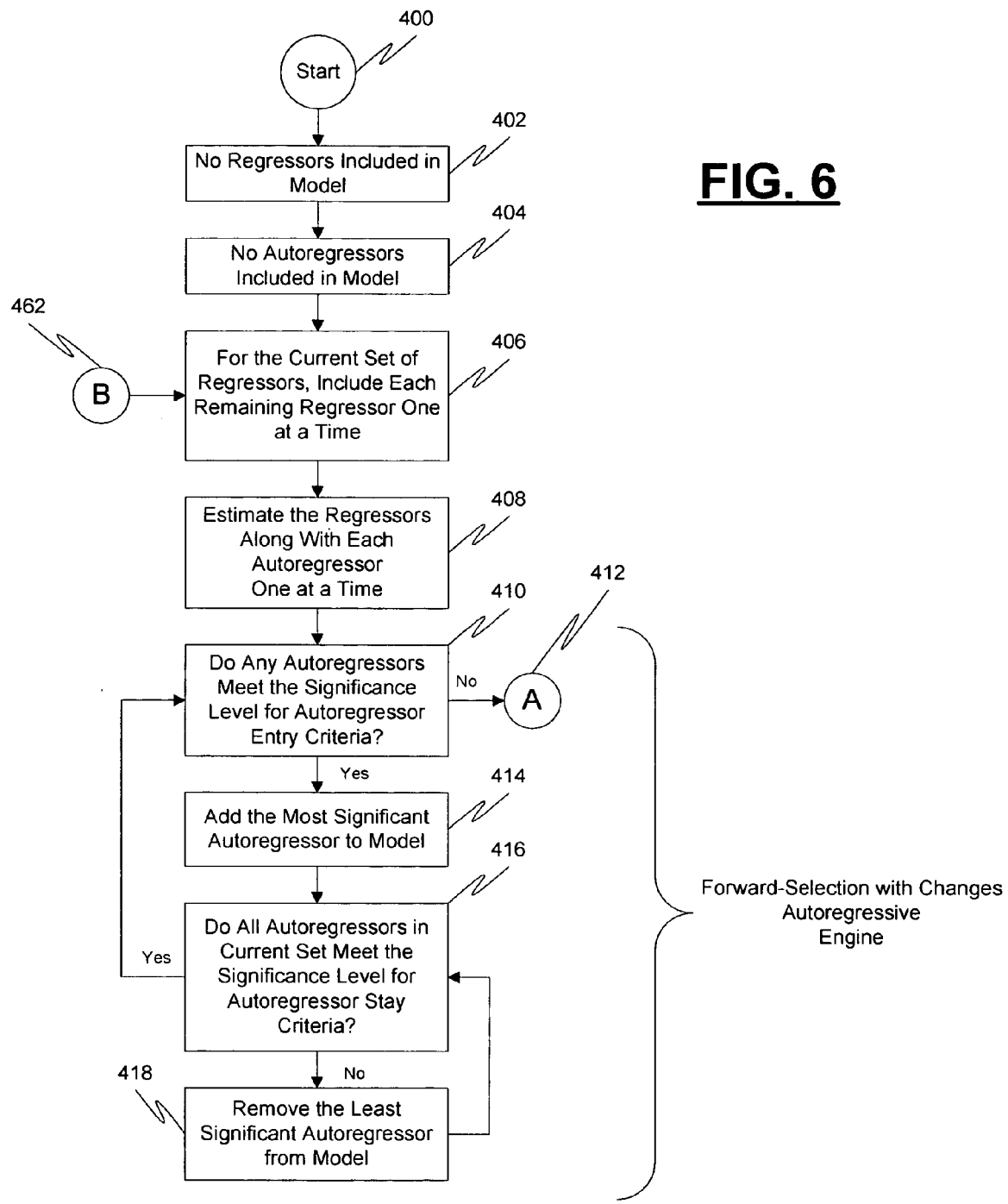
FIGS. 6 and 7 are flowcharts illustrating an operational scenario wherein a forward-selection with changes technique is used to select one or more autoregressors and a forward-selection with changes technique is used to select one or more regressors.

FIG. 6 illustrates an operational scenario wherein a forward-selection with changes technique is used to select one or more autoregressors and a forward-selection with changes technique is used to select one or more regressors. With reference to FIG. 6, start block 400 indicates that at block 402, the model initially contains no regressors. Block 404 indicates that no autoregressors are included in the model. Process block 406 ensures that for the current set of candidate regressors each regressor is processed one at a time as follows.

Process block 408 estimates the regressors along with each autoregressors one at a time. Process block 410 examines whether any autoregressors satisfy the significance level for the autoregressor entry criteria. If no autoregressors meet the significance level, then processing continues at process block 452 on FIG. 7 as indicated by continuation marker 412. However if one or more autoregressors satisfy the significance level as determined by process block 410, then process block 414 adds the most significant autoregressors to the model.

Process block 416 examines whether all autoregressors of the current set meet the significance level for the autoregressor stay criteria. If they do, then processing continues at process block 410. However if they do not, then process block 418 removes the least significant autoregressor from the model. Process block 416 examines whether all of the remaining autoregressors in the current set meet the significance level. If they do, then process block 410 is performed with respect to the remaining autoregressors.

Figure 7:
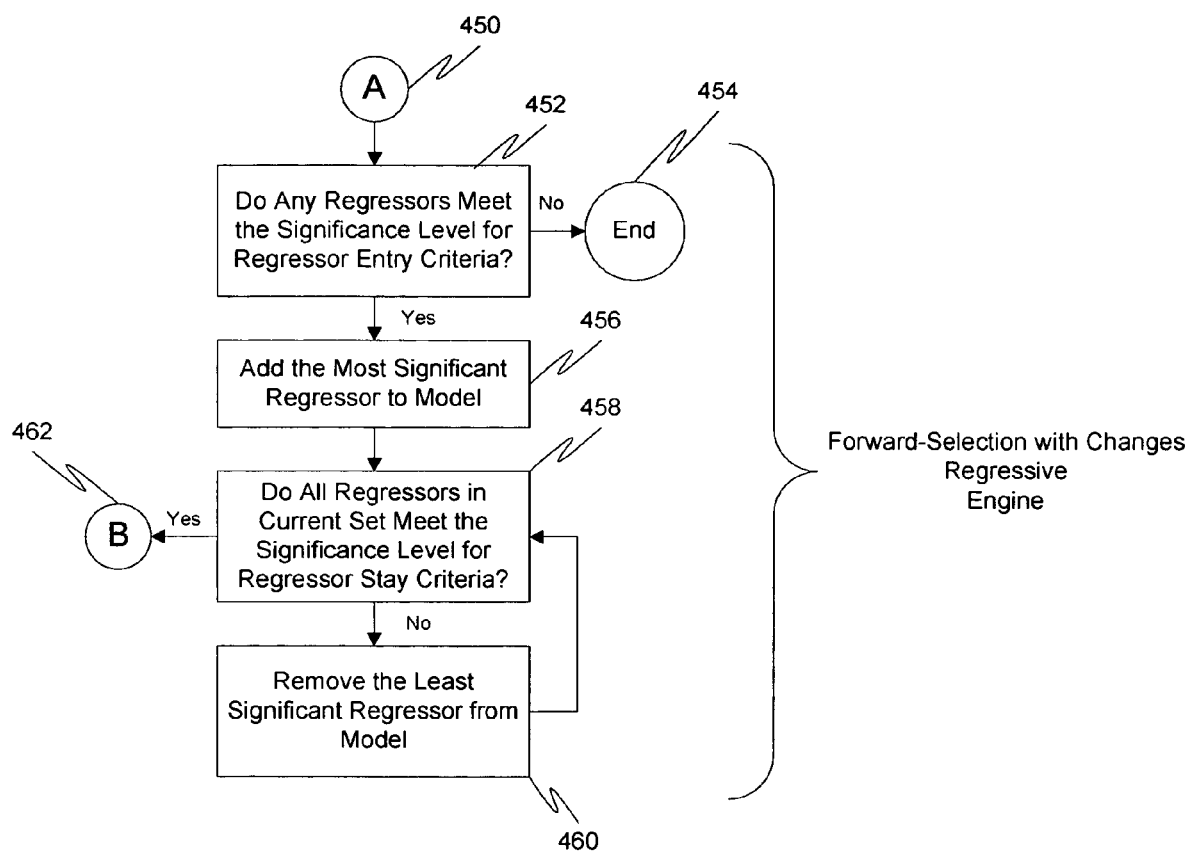

FIG. 7 depicts the processing that results from the evaluation performed by process block 410 shown on FIG. 6. With reference to FIG. 7, process block 452 examines whether any regressors meet the significance level for the regressor entry criteria. If no regressors meet the significance level, then processing for this operational scenario terminates at end block 454. However if there are one or more regressors that do meet the significance level as determined at process block 452, then process block 456 adds the most significant regressor to the model.

Process block 458 examines whether all regressors in the current set meet the significance level for the regressor stay criteria. If all regressors do not meet the significance level, then process block 460 removes the least significant regressor from the model before processing returns to process block 458. However if all regressors do meet the significance level as determined at process block 458, then processing continues at process block 406 on FIG. 6 as indicated by the continuation marker 462.

As another example of a forward-selection with changes technique being used to select one or more autoregressors and a forward-selection with changes technique being used to select one or more regressors, the following is provided. In this example, the following is assumed: Regressors (X1, X2, X3) and Autoregressors (P1, P2, P3).

Estimate the following to check X1 autoregressors:
X1 P1.
X1 P2.
X1 P3.
Most significant autoregressor=X1 P2.
Does it meet entry requirement=Yes.

Estimate the following to check X1 P2 autoregressors:
X1 P2 P1.
X1 P2 P3.
Most significant autoregressor=X1 P2 P3.
Does it meet entry requirement=Yes.
Least significant autoregressor=P3.
Does P3 meet stay requirement=No.
Best X1 Model=X1 P2.

Estimate the following to check X2 autoregressors:
X2 P1.
X2 P2.
X2 P3.
Most significant autoregressor=X2 P2.
Does it meet entry requirement=Yes.

Estimate the following to check X2 P2 autoregressors:
X2 P2 P1.
X2 P2 P3.
Most significant autoregressor=X2 P2 P1.
Does it meet entry requirement=Yes.
Least significant autoregressor=P1.
Does P1 meet stay requirement=Yes.

Estimate the following to check X2 P2 P1 autoregressors:
X2 P2 P1 P3.
Most significant autoregressor=X2 P2 P1 P3.
Does it meet entry requirement=No.
Least significant autoregressor=P1.
Does P1 meet stay requirement=Yes.
Best X2 Model=X2 P2 P1.

Estimate the following to check X3 autoregressors:
X3 P1.
X3 P2.
X3 P3.
Most significant autoregressor=X3 P2.
Does it meet entry requirement=No.
Best X3=X3.

Estimate the following to check regressor:
X1 P2.
X2 P2 P1.
X3.
Most significant regressor=X2.
Does X2 meet entry requirement=Yes.
Add X2 to model.
Least significant regressor=X2.
Does X2 meet stay requirement=Yes.
Keep X2 in model.

Estimate the following to check X2 X1 autoregressors:
X2 X1 P1.
X2 X1 P2.
X2 X1 P3.
Most significant autoregressor=X2 X1 P2.
Does it meet entry requirement=Yes.

Estimate the following to check X2 X1 P2 autoregressors:
X2 X1 P2 P1.
X2 X1 P2 P3.
Most significant autoregressor=X2 X1 P2 P3.
Does it meet entry requirement=No.
Least significant autoregressor=P2.
Does P2 meet stay requirement=Yes.
Best X2 X1 model=X2 X1 P2.

Estimate the following to check X2 X3 autoregressors:
X2 X3 P1.
X2 X3 P2.
X2 X3 P3.
Most significant autoregressor=X2 X3 P1.
Does it meet entry requirement=Yes.

Estimate the following to check X2 X3 P1 autoregressors:
X2 X3 P1 P2.
X2 X3 P1 P3.
Most significant autoregressor=X2 X3 P1 P3.
Does it meet entry requirement=No.
Best X2 X3 model=X2 X3 P1.

Estimate the following to check regressor:
X2 X1 P2.
X2 X3 P1.
Most significant X2 regressor=X3.
Does X3 meet entry requirement=Yes.
Add X3 to model.
Least significant regressor=X3.
Does X3 meet stay requirement=Yes.
Keep X3 in model.

Estimate the following to check X2 X3 X1 autoregressors:
X2 X3 X1 P1.
X2 X3 X1 P2.
X2 X3 X1 P3.
Most significant autoregressor=X2 X3 X1 P2.
Does it meet entry requirement=Yes.

Estimate the following to check X2 X3 X1 P2 autoregressors:
X2 X3 X1 P2 P1.
X2 X3 X1 P2 P3.
Most significant model=X2 X3 X1 P2 P3.
Does it meet entry requirement=No.
Best X2 X3 model=X2 X3 X1 P2.

Estimate the following to check regressor:
X2 X3 X1 P2.
Most significant X2 X3 regressor=X1.
Does X1 meet entry requirement=Yes.
Add X1 to model.
Least significant regressor=X3.
Does X3 meet stay requirement=No.
Delete X3 from model.

Estimate the following to check X2 X1 X3 autoregressors:
X2 X1 X3 P1.
X2 X1 X3 P2.
X2 X1 X3 P3.
Most significant autoregressor=X2 X1 X3 P2.
Does it meet entry requirement=Yes.

Estimate the following to check X2 X1 X3 P2 autoregressors:
X2 X1 X3 P2 P1.
X2 X1 X3 P2 P3.
Most significant model=X2 X1 X3 P2 P3.
Does it meet entry requirement Yes.
Least significant autoregressor=P2.
Does P2 meet stay requirement=Yes.

Estimate the following to check X2 X1 X3 P2 P3 autoregressors:
X2 X1 X3 P2 P3 P1.
Most significant model=X2 X1 X3 P2 P3 P1.
Does it meet entry requirement=No.
Least significant autoregressor=P2.
Does P2 meet stay requirement=Yes.
Best X2 X1 model=X2 X1 X3 P2 P3.

Estimate the following to check regressor:
X2 X1 X3 P2 P3.
Most significant X2 X1 regressor=X3.
Does X3 meet entry requirement=Yes.
Add X3 to model.
Least significant regressor=X3.
Does X3 meet stay requirement=Yes.
Keep X3 in model.

Based upon the aforementioned analysis, the model includes the following selected regressors and autoregressors: X2, X1, X3, P2, and P3.

Figure 8:
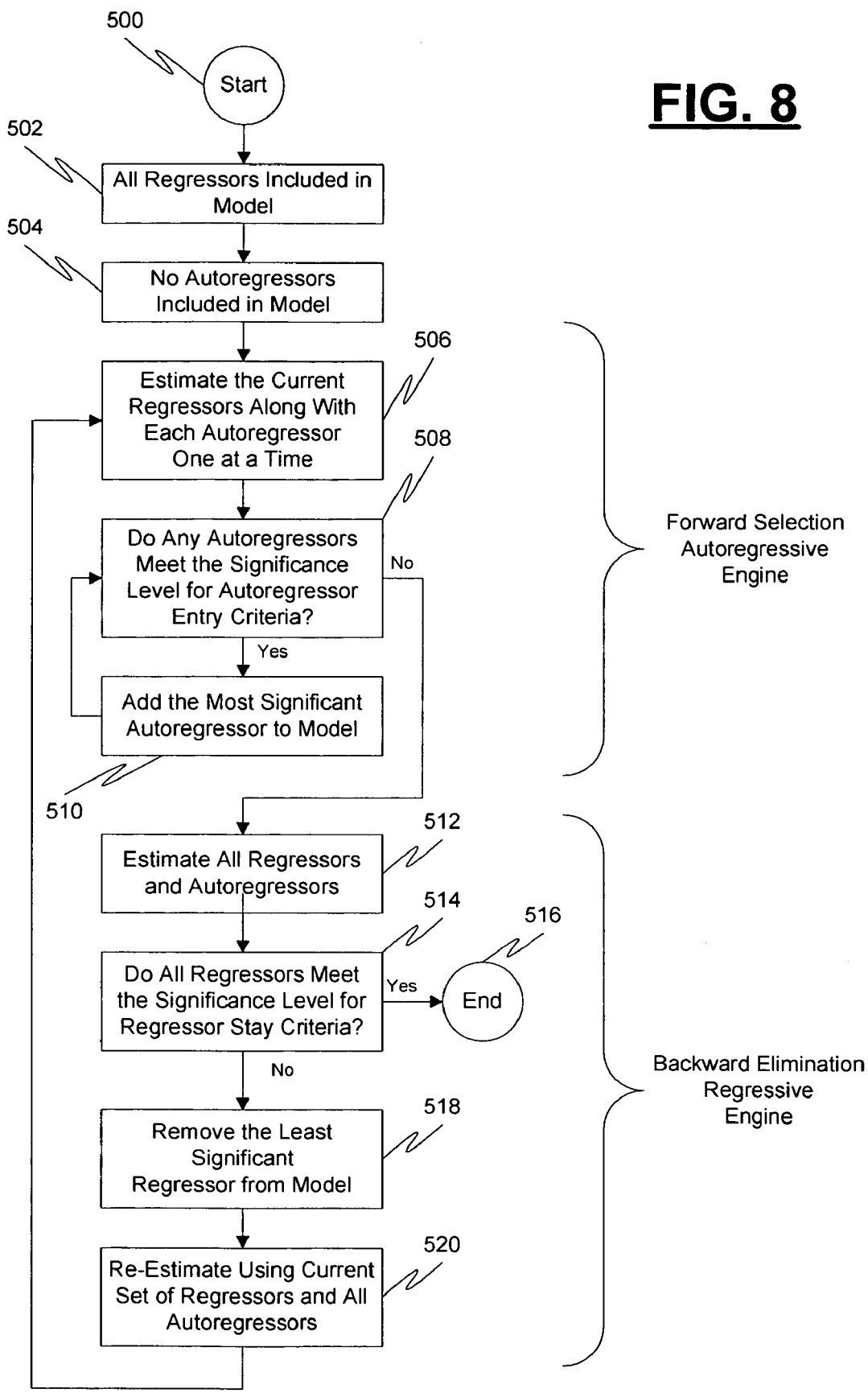
FIG. 8 is a flowchart illustrating an operational scenario wherein a forward selection technique is used to select one or more autoregressors and a backward elimination technique is used to select one or more regressors.

FIG. 8 illustrates an operational scenario wherein a forward selection technique is used to select one or more autoregressors and a backward elimination technique is used to select one or more regressors. With reference to FIG. 8, start block 500 indicates that at block 502, the model initially begins with all regressors. Block 504 indicates that no autoregressors are included in the model.

Process block 506 performs an estimation with the current set of candidate regressors along with each candidate autoregressor one at a time. Process block 508 examines whether any autoregressors meet the significance level for the autoregressor entry criteria. If no autoregressors meet the significance level, then processing continues at process block 512. However if any autoregressors meet the significance level, then process block 510 adds the most significant autoregressor to the model. Processing continues at process block 508.

If no autoregressors meet the significance level as determined at process block 508, then process block 512 performs an estimation with all regressors and autoregressors. Process block 514 examines whether all regressors meet the significance level for the regressor stay criteria. If they do, then processing for this operational scenario terminates at end block 516. However if one or more regressors do not meet the significance level as determined by process block 514, then process block 518 removes the least significant regressor from the model. Process block 520 performs an estimation using the current set of regressors and all selected autoregressors. Processing then continues at process block 506.

As another example of a forward selection technique being used to select one or more autoregressors and a backward elimination technique being used to select one or more regressors, the following is provided. In this example, the following is assumed: Regressors (X1, X2, X3) and Autoregressors (P1, P2, P3).

Estimate the following to check X1 X2 X3 autoregressors:
X1 X2 X3 P1.
X1 X2 X3 P2.
X1 X2 X3 P3.
Most significant autoregressor=X1 X2 X3 P2.
Does it meet entry requirement=Yes.

Estimate the following to check X1 X2 X3 P2 autoregressors:
X1 X2 X3 P2 P1.
X1 X2 X3 P2 P3.
Most significant autoregressor=X1 X2 X3 P2 P3.
Does it meet entry requirement=Yes.

Estimate the following to check X1 X2 X3 P2 P3 autoregressors:
X1 X2 X3 P2 P3 P1.
Most significant autoregressor=X1 X2 X3 P2 P3 P1.
Does it meet entry requirement=No.

Estimate the following to check regressors:
X1 X2 X3 P2 P3.
Least significant regressor=X1.
Does X1 meet stay requirement=No.
Delete X1 from model.

Estimate the following to check X2 X3 autoregressors:
X2 X3 P1.
X2 X3 P2.
X2 X3 P3.
Most significant autoregressor=X2 X3 P1.
Does it meet entry requirement=No.

Estimate the following to check regressors:
X2 X3.
Least significant term=X2.
Does X2 meet stay requirement=No.
Delete X2 from model.

Estimate the following to check X3 autoregressors:
X3 P1.
X3 P2.
X3 P3.
Most significant autoregressor=X3 P1.
Does it meet entry requirement=Yes.

Estimate the following to check X3 P1 autoregressors:
X3 P1 P2.
X3 P1 P3.
Most significant autoregressor=X3 P1 P2.
Does it meet entry requirement=Yes.

Estimate the following to check X3 P1 P2 autoregressors:
X3 P1 P2 P3.
Most significant autoregressor=X3 P1 P2 P3.
Does it meet entry requirement=No.

Estimate the following to check regressors:
X3 P1 P2.
Least significant term=X3.
Does X3 meet stay requirement=Yes.
Keep X3 in model.

Based upon the aforementioned analysis, the model includes the following selected regressors and autoregressors: X3, P1, and P2.

Figure 9:
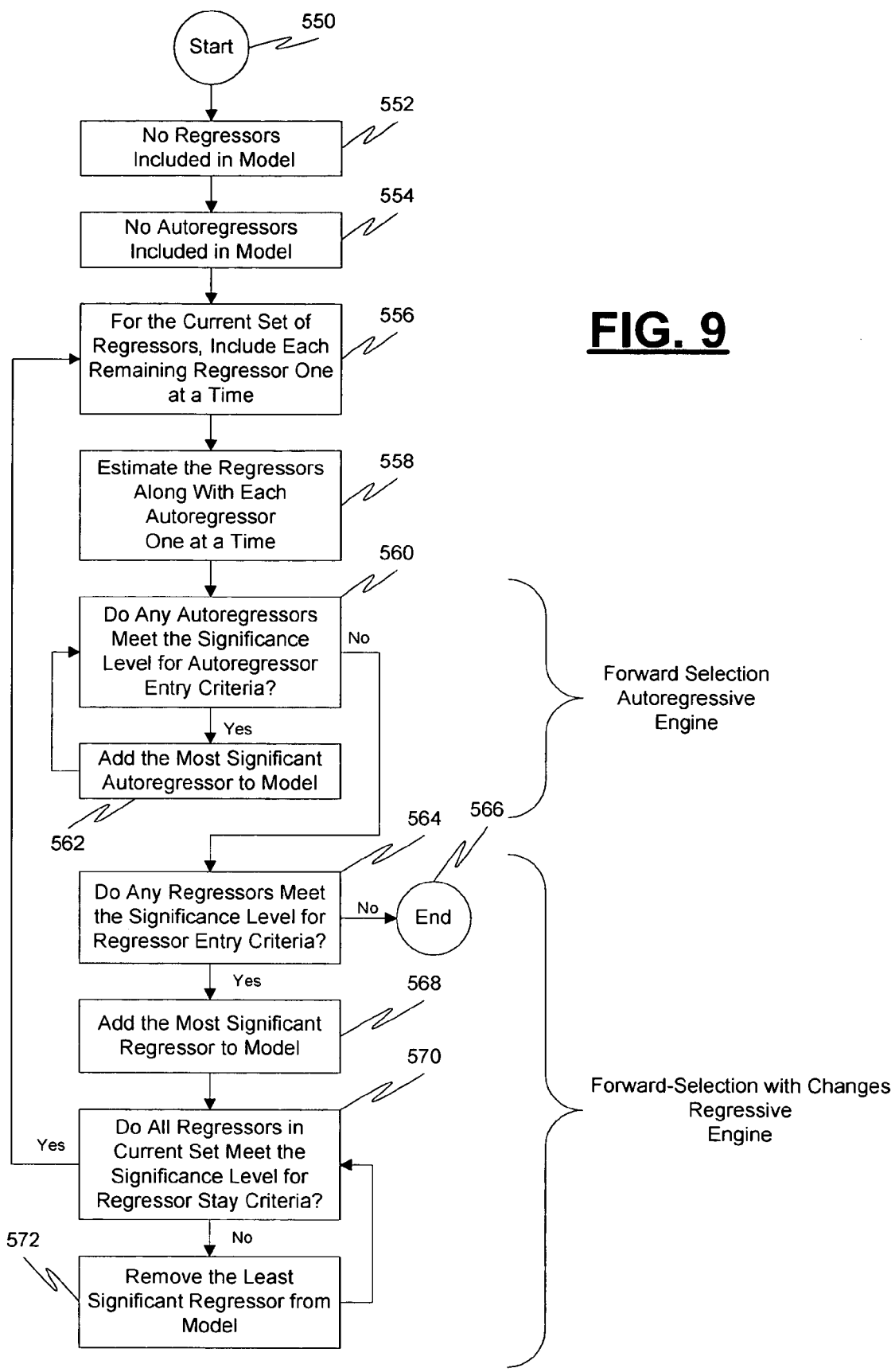
FIG. 9 is a flowchart illustrating an operational scenario wherein a forward selection technique is used to select one or more autoregressors and a forward-selection with changes technique is used to select one or more regressors.

FIG. 9 illustrates an operational scenario wherein a forward selection technique is used to select one or more autoregressors and a forward-selection with changes technique is used to select one or more regressors. With reference to FIG. 9, start block 550 indicates that at block 552, the model initially begins with no regressors. Block 554 indicates that no autoregressors are included in the model.

Process block 556 allows processing to be performed for the current set of candidate regressors such that each regressor is processed one at a time as follows. Process block 558 performs an estimation with the regressors along with each autoregressor one at a time. Process block 560 examines whether any autoregressors meet the significance level for the autoregressor entry criteria. If there are no autoregressors that meet the significance level, then processing continues at process block 564. However if one or more autoregressors meet the significance level, then process block 562 adds the most significant autoregressor to the model before processing continues at process block 560.

Process block 564 examines whether any regressors meet the significance level for the regressor entry criteria. If no regressors meet the significance level, then processing for this operational scenario terminates at end block 566. However if there are one or more regressors that meet the significance level, then process block 568 adds the most significant regressor to the model. Process block 570 examines whether all regressors in the current set meet the significance level for the regressors stay criteria. If all regressors meet the significance level, then processing continues at process block 556. However if not all regressors meet the significance level, then process block 572 removes the least significant regressor from the model before processing returns to process block 570.

As another example of a forward selection technique being used to select one or more autoregressors and a forward-selection with changes technique being used to select one or more regressors, the following is provided. In this example, the following is assumed: Regressors (X1, X2, X3) and Autoregressors (P1, P2, P3).

Estimate the following to check X1 autoregressors:
X1 P1.
X1 P2.
X1 P3.
Most significant autoregressor=X1 P2.
Does it meet entry requirement=Yes.

Estimate the following to check X1 P2 autoregressors:
X1 P2 P1.
X1 P2 P3.
Most significant autoregressor=X1 P2 P3.
Does it meet entry requirement=Yes.

Estimate the following to check X1 P2 P3 autoregressors:
X1 P2 P3 P1.
Most significant autoregressor=X1 P2 P3 P1.
Does it meet entry requirement=No.
Best X1 Model=X1 P2 P3.

Estimate the following to check X2 autoregressors:
X2 P1.
X2 P2.
X2 P3.
Most significant autoregressor=X2 P2.
Does it meet entry requirement=Yes.

Estimate the following to check X2 P2 autoregressors:
X2 P2 P1.
X2 P2 P3.
Most significant autoregressor=X2 P2 P1.
Does it meet entry requirement=Yes.

Estimate the following to check X2 P2 P1 autoregressors:
X2 P2 P1 P3.
Most significant autoregressor=X2 P2 P1 P3.
Does it meet entry requirement=No.
Best X2 Model=X2 P2 P1.

Estimate the following to check X3 autoregressors:
X3 P1.
X3 P2.
X3 P3.
Most significant autoregressor=X3 P2.
Does it meet entry requirement=No.
Best X3=X3.

Estimate the following to check regressor:
X1 P2 P3.
X2 P2 P1.
X3.
Most significant regressor=X2.
Does X2 meet entry requirement=Yes.
Add X2 to model.
Least significant regressor=X2.
Does X2 meet stay requirement=Yes.
Keep X2 in model.

Estimate the following to check X2 X1 autoregressors:
X2 X1 P1.
X2 X1 P2.
X2 X1 P3.
Most significant autoregressor=X2 X1 P2.
Does it meet entry requirement=Yes.

Estimate the following to check X2 X1 P2 autoregressors:
X2 X1 P2 P1.
X2 X1 P2 P3.
Most significant autoregressor=X2 X1 P2 P3.
Does it meet entry requirement=No.
Best X2 X1 model=X2 X1 P2.

Estimate the following to check X2 X3 autoregressors:
X2 X3 P1.
X2 X3 P2.
X2 X3 P3.
Most significant autoregressor=X2 X3 P1.
Does it meet entry requirement=Yes.

Estimate the following to check X2 X3 P1 autoregressors:
X2 X3 P1 P2.
X2 X3 P1 P3.
Most significant autoregressor=X2 X3 P1 P3.
Does it meet entry requirement=Yes.

Estimate the following to check X2 X3 P1 P3 autoregressors:
X2 X3 P1 P3 P2.
Most significant autoregressor=X2 X3 P1 P3 P2.
Does it meet entry requirement=No.
Best X2 X3 model=X2 X3 P1 P3.

Estimate the following to check regressor:
X2 X1 P2.
X2 X3 P1 P3.
Most significant X2 regressor=X3.
Does X3 meet entry requirement=Yes.
Add X3 to model.
Least significant regressor=X3.
Does X3 meet stay requirement=Yes.
Keep X3 in model.

Estimate the following to check X2 X3 X1 autoregressors:
X2 X3 X1 P1.
X2 X3 X1 P2.
X2 X3 X1 P3.
Most significant autoregressor=X2 X3 X1 P2.
Does it meet entry requirement=Yes.

Estimate the following to check X2 X3 X1 P2 autoregressors:
X2 X3 X1 P2 P1.
X2 X3 X1 P2 P3.
Most significant model=X2 X3 X1 P2 P3.
Does it meet entry requirement=No.

Estimate the following to check regressor:
X2 X3 X1 P2.
Most significant X2 X3 regressor=X1.
Does X1 meet entry requirement=Yes.
Add X1 to model.
Least significant regressor=X1.
Does X1 meet stay requirement=No.
Delete X1 from model.

Based upon the aforementioned analysis, the model includes the following selected regressors and autoregressors: X2, X3, P1, and P3.

Figure 10:
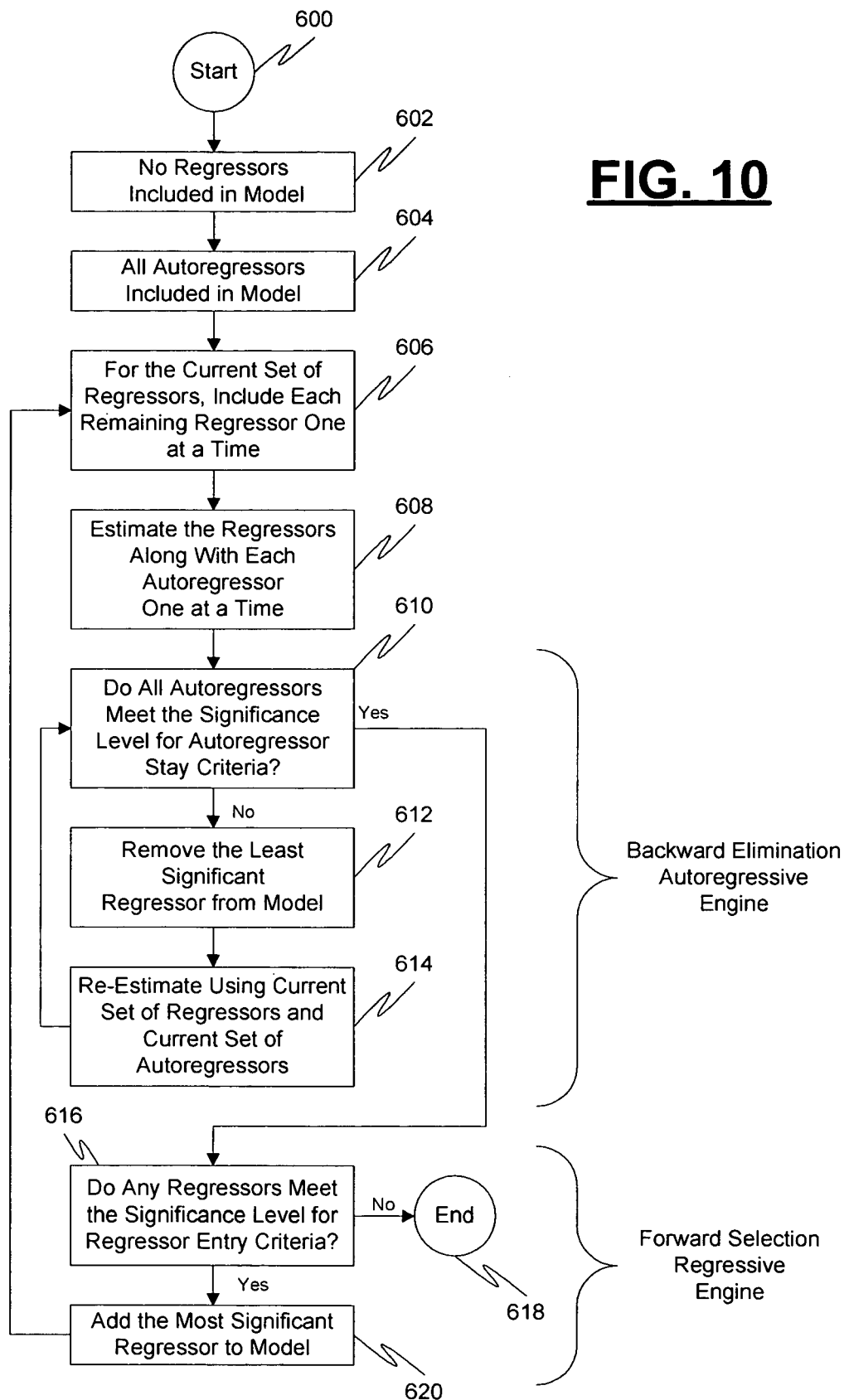
FIG. 10 is a flowchart illustrating an operational scenario wherein a backward elimination technique is used to select one or more autoregressors and a forward selection technique is used to select one or more regressors.

FIG. 10 illustrates an operational scenario wherein a backward elimination technique is used to select one or more autoregressors and a forward selection technique is used to select one or more regressors. With reference to FIG. 10, start block 600 indicates that at block 602, the model initially begins with no regressors. Block 604 indicates that all autoregressors are included in the model.

For the current set of regressors, process block 606 indicates that each candidate regressor is processed one at a time as follows. Process block 608 performs an estimation with regressors along with each autoregressor one and a time. Process block 610 examines whether all autoregressors meet the significance level for the autoregressors stay criteria. If all autoregressors meet the significance level, then processing continues at process block 616. However if one or more autoregressors do not meet the significance level, then process block 612 removes the least significant regressor from the model. Process block 614 performs an estimation using the current set of regressors and the current set of autoregressors. Processing then continues at process block 610.

When processing reaches process block 616, process block 616 examines whether any regressors meet the significance level for the regressor entry criteria. If no regressors meet the significance level, then processing terminates for this operational scenario at end block 618. However if one or more regressors meet the significance level, then process block 620 adds the most significant regressor to the model before processing continues at process block 606.

As another example of a backward elimination technique being used to select one or more autoregressors and a forward selection technique being used to select one or more regressors, the following is provided. In this example, the following is assumed: Regressors (X1, X2, X3) and Autoregressors (P1, P2, P3).

Estimate the following to check X1 autoregressors:
X1 P1 P2 P3.
Least significant autoregressor=P2.
Does it meet stay requirement=No.

Estimate the following to check X1 autoregressors:
X1 P1 P3.
Least significant autoregressor=P3.
Does it meet stay requirement=Yes.
Best X1 Model=X1 P1 P3.

Estimate the following to check X2 autoregressors:
X2 P1 P2 P3.
Least significant autoregressor=P1.
Does it meet stay requirement=Yes.
Best X2 Model=X2 P1 P2 P3.

Estimate the following to check X3 autoregressors:
X3 P1 P2 P3.
Least significant autoregressor=P1.
Does it meet stay requirement=No.

Estimate the following to check X3 autoregressors:
X3 P2 P3.
Least significant autoregressor=P2.
Does it meet stay requirement=No.

Estimate the following to check X3 autoregressors:
X3 P3.
Least significant autoregressor=P3.
Does it meet stay requirement=Yes.
Best X3 Model=X3 P3.

Estimate the following to check regressors:
X1 P1 P3.
X2 P1 P2 P3.
X3 P3.
Most significant regressor=X1.
Does it meet entry requirement=Yes.
Add X1 to model.

Estimate the following to check X1 X2 autoregressors:
X1 X2 P1 P2 P3.
Least significant autoregressor=P1.
Does it meet stay requirement=No.

Estimate the following to check X1 X2 autoregressors:
X1 X2 P2 P3.
Least significant autoregressor=P3.
Does it meet stay requirement=Yes.
Best X1 X2 Model=X1 X2 P2 P3.

Estimate the following to check X1 X3 autoregressors:
X1 X3 P1 P2 P3.
Least significant autoregressor=P1.
Does it meet stay requirement=Yes.
Best X1 X3 Model=X1 X3 P1 P2 P3.

Estimate the following to check regressors:
X1 X2 P2 P3.
X1 X3 P1 P2 P3.
Most significant term=X3.
Does X3 meet stay requirement=Yes.
Add X3 to model.

Estimate the following to check X1 X3 X2 autoregressors:
X1 X3 X2 P1 P2 P3.
Least significant autoregressor=P1.
Does it meet stay requirement=No.

Estimate the following to check X1 X3 X2 autoregressors:
X1 X3 X2 P2 P3.
Least significant autoregressor=P3.
Does it meet stay requirement=No.

Estimate the following to check X1 X3 X2 autoregressors:
X1 X3 X2 P2.
Least significant autoregressor=P2.
Does it meet stay requirement=Yes.
Best X1 X3 X2 Model=X1 X3 X2 P2.

Estimate the following to check regressors:
X1 X3 X2 P2.
Does X2 meet entry requirement=Yes.
Add X2 to model.

Based upon the aforementioned analysis, the model includes the following selected regressors and autoregressors: X1, X3, X2, and P2.

Figure 11:
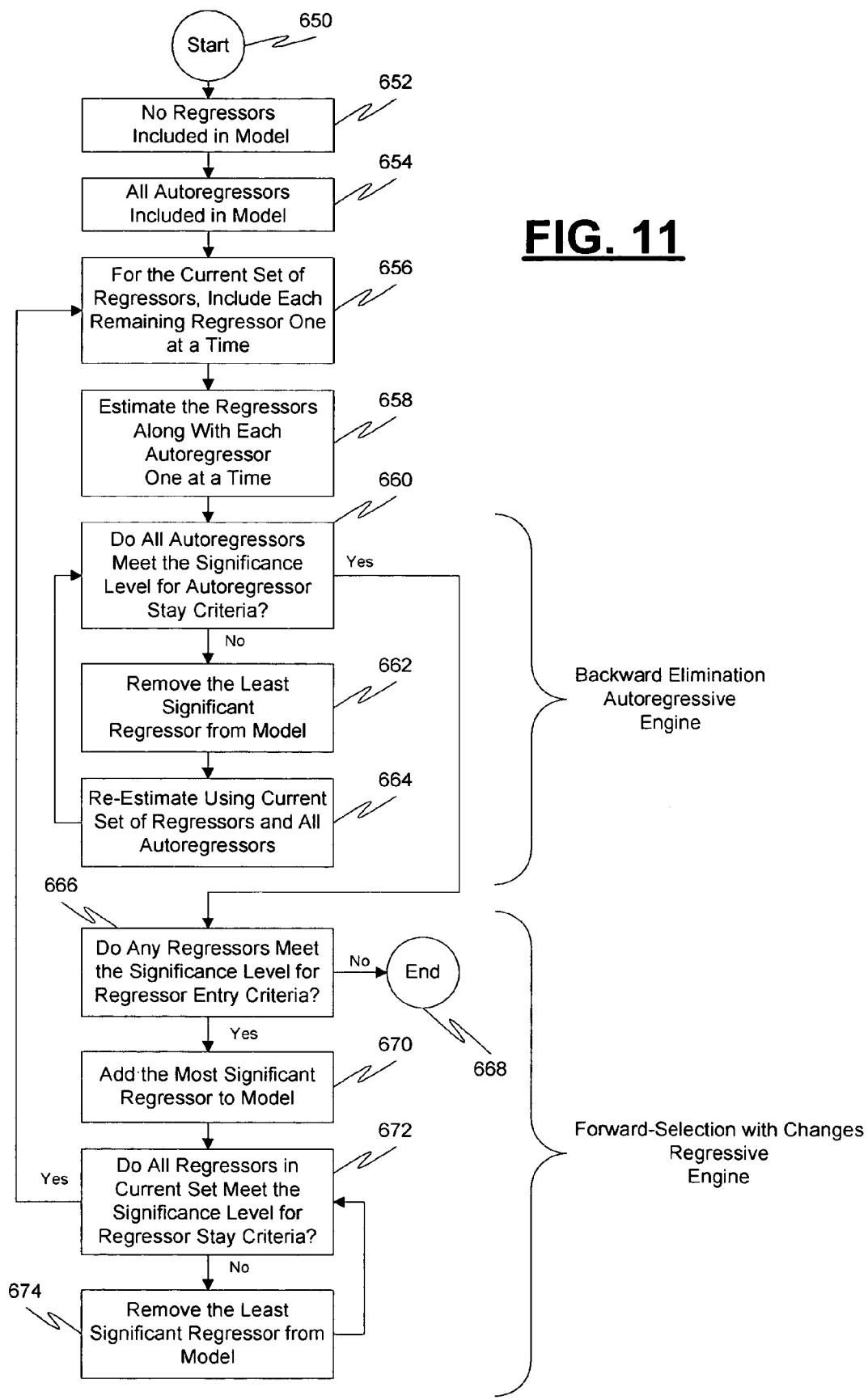
FIG. 11 is a flowchart illustrating an operational scenario wherein a backward elimination technique is used to select one or more autoregressors and a forward-selection with changes technique is used to select one or more regressors.

FIG. 11 illustrates an operational scenario wherein a backward elimination technique is used to select one or more autoregressors and a forward-selection with changes technique is used to select one or more regressors. With reference to FIG. 11, start block 650 indicates that at block 652, the model initially begins with no regressors. Block 654 indicates that all autoregressors are included in the model.

For the current set of regressors, process block 656 includes in the processing each regressor one at a time. Process block 658 performs an estimation with the regressors along with each autoregressor one at a time. Process block 660 examines whether all autoregressors meet the significance level for the autoregressor stay criteria. If they do, then processing continues at process block 666. However if not all autoregressors meet the significance level, then process block 662 removes the least significant regressor from the model. Process block 664 performs an estimation using the current set regressors and all autoregressors. Processing continues at process block 660 which examines whether all autoregressors meet the significance level.

When processing reaches process block 666, process block 666 examines whether any regressors meet the significance level for the regressor entry criteria. If no regressors meet the significance level, then processing terminates for this operational scenario at end block 668. However if one or more regressors meet the significance level, then process block 670 adds the most significant regressor to the model. Process block 672 examines whether all regressors in the current set meet the significance level for the regressor stay criteria. If they do, processing continues at process block 656. However if not all regressors meet the significance level, then process block 674 removes the least significant regressor from the model. Processing then continues at process block 672.

As another example of a backward elimination technique being used to select one or more autoregressors and a forward-selection with changes technique being used to select one or more regressors, the following is provided. In this example, the following is assumed: Regressors (X1, X2, X3) and Autoregressors (P1, P2, P3).

Estimate the following to check X1 autoregressors:
X1 P1 P2 P3.
Least significant autoregressor=P2.
Does it meet stay requirement=No.

Estimate the following to check X1 autoregressors:
X1 P1 P3.
Least significant autoregressor=P3.
Does it meet stay requirement=Yes.
Best X1 Model=X1 P1 P3.

Estimate the following to check X2 autoregressors:
X2 P1 P2 P3.
Least significant autoregressor=P1.
Does it meet stay requirement=Yes.
Best X2 Model=X2 P1 P2 P3.

Estimate the following to check X3 autoregressors:
X3 P1 P2 P3.
Least significant autoregressor=P1.
Does it meet stay requirement=No.

Estimate the following to check X3 autoregressors:
X3 P2 P3.
Least significant autoregressor=P3.
Does it meet stay requirement=No.

Estimate the following to check X3 autoregressors:
X3 P3.
Least significant autoregressor=P3.
Does it meet stay requirement=Yes.
Best X3 Model=X3 P3.

Estimate the following to check regressors:
X1 P1 P3.
X2 P1 P2 P3.
X3 P3.
Most significant regressor=X1.
Does it meet entry requirement=Yes.
Add X1 to model.
Least significant regressor=X1.
Does it meet stay requirement=Yes.
Keep X1 in model.

Estimate the following to check X1 X2 autoregressors:
X1 X2 P1 P2 P3.
Least significant autoregressor=P1.
Does it meet stay requirement=No.

Estimate the following to check X1 X2 autoregressors:
X1 X2 P2 P3.
Least significant autoregressor=P3.
Does it meet stay requirement=Yes.
Best X1 X2 Model=X1 X2 P2 P3.

Estimate the following to check X1 X3 autoregressors:
X1 X3 P1 P2 P3.
Least significant autoregressor=P1.
Does it meet stay requirement=Yes.
Best X1 X3 Model=X1 X3 P1 P2 P3.

Estimate the following to check regressors:
X1 X2 P2 P3.
X1 X3 P1 P2 P3.
Most significant term=X3.
Does X3 meet stay requirement=Yes.
Add X3 to model.
Least significant term=X1.
Does X1 meet stay requirement=Yes.
Keep X1 in model.

Estimate the following to check X1 X3 X2 autoregressors:
X1 X3 X2 P1 P2 P3.
Least significant autoregressor=P1.
Does it meet stay requirement=No.

Estimate the following to check X1 X3 X2 autoregressors:
X1 X3 X2 P2 P3.
Least significant autoregressor=P3.
Does it meet stay requirement=No.

Estimate the following to check X1 X3 X2 autoregressors:
X1 X3 X2 P2.
Least significant autoregressor=P2.
Does it meet stay requirement=Yes.
Best X1 X3 X2 Model=X1 X3 X2 P2.

Estimate the following to check regressors:
X1 X3 X2 P2.
Does X2 meet entry requirement=Yes.
Add X2 to model.
Least significant term=X1.
Does X1 meet stay requirement=Yes.
Keep X1 in model.

Based upon the aforementioned analysis, the model includes the following selected regressors and autoregressors: X1, X3, X2, and P2.

Figure 12:
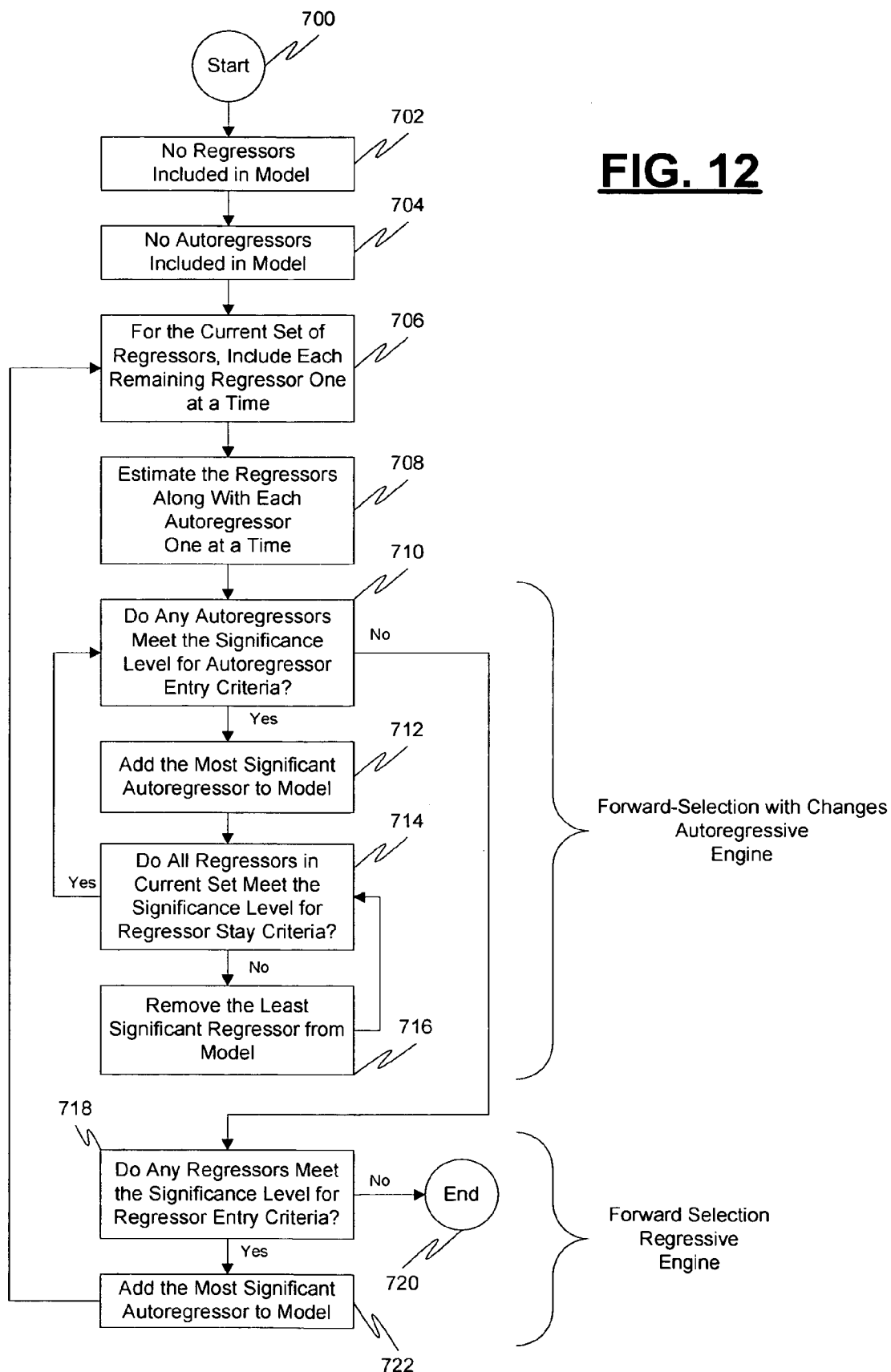
FIG. 12 is a flowchart illustrating an operational scenario wherein a forward-selection with changes technique is used to select one or more autoregressors and a forward selection technique is used to select one or more regressors.

FIG. 12 illustrates an operational scenario wherein a forward-selection with changes technique is used to select one or more autoregressors and a forward selection technique is used to select one or more regressors. With reference to FIG. 12, start block 700 indicates that at block 702, the model initially begins with no regressors. Block 704 indicates that no autoregressors are included in the model.

For the set of candidate regressors, process block 706 includes the candidate regressors one and a time as follows. Process block 708 performs an estimation using the regressors along with each autoregressor one and a time. Process block 710 examines whether any autoregressors meet the significance level for the autoregressor entry criteria. If no autoregressors meet the significance level, then processing continues at process block 718. However if one or more autoregressors meet the significance level, then process block 712 adds the most significant autoregressor to the model. Process block 714 examines whether all regressors in the current set meet the significance level for the regressor stay criteria. If they do, then processing continues at process block 710. However if one or more regressors in the current set do not meet the significance level, then process block 716 removes the least significant regressor from the model. Processing continues at process block 714.

When processing reaches process block 718, process block 718 examines whether any regressors meet the significance level for the regressor entry criteria. If no regressors meet the significance level, then processing for this operational scenario terminates at end block 720. However if one or more regressors do meet the significance level, then process block 722 adds the most significant autoregressor to the model before processing continues at process block 706. Process block 706 then proceeds to process any remaining regressors.

As another example of a forward-selection with changes technique being used to select one or more autoregressors and a forward selection technique being used to select one or more regressors, the following is provided. In this example, the following is assumed: Regressors (X1, X2, X3) and Autoregressors (P1, P2, P3).

Estimate the following to check X1 autoregressors:
X1 P1.
X1 P2.
X1 P3.
Most significant autoregressor=X1 P2.
Does P2 meet entry requirement=Yes.

Estimate the following to check X1 P2 autoregressors:
X1 P2 P1.
X1 P2 P3.
Most significant autoregressor=X1 P2 P3.
Does P3 meet entry requirement=Yes.
Least significant autoregressor=P2.
Does P2 meet stay requirement=No.

Estimate the following to check X1 P3 autoregressors:
X1 P3 P1.
Most significant autoregressor=X1 P3 P1.
Does P1 meet entry requirement=Yes.
Least significant autoregressor=P1.
Does P1 meet stay requirement=No.
Best X1 Model=X1 P3.

Estimate the following to check X2 autoregressors:
X2 P1.
X2 P2.
X2 P3.
Most significant autoregressor=X2 P2.
Does it meet entry requirement=Yes.

Estimate the following to check X2 P2 autoregressors:
X2 P2 P1.
X2 P2 P3.
Most significant autoregressor=X2 P2 P1.
Does P1 meet entry requirement=Yes.
Least significant autoregressor P1.
Does P1 meet stay requirement=Yes.

Estimate the following to check X2 P2 P1 autoregressors:
X2 P2 P1 P3.
Most significant autoregressor=X2 P2 P1 P3.
Does P3 meet entry requirement=No.
Least significant autoregressor=P1.
Does P1 meet stay requirement=Yes.
Best X2 Model=X2 P2 P1.

Estimate the following to check X3 autoregressors:
X3 P1.
X3 P2.
X3 P3.
Most significant autoregressor=X3 P2.
Does it meet entry requirement=No.
Best X3=X3.

Estimate the following to check regressor:
X1 P3.
X2 P2 P1.
X3.
Most significant regressor=X2.
Does X2 meet entry requirement=Yes.
Add X2 to model.

Estimate the following to check X2 X1 autoregressors:
X2 X1 P1.
X2 X1 P2.
X2 X1 P3.
Most significant autoregressor=X2 X1 P2.
Does it meet entry requirement=Yes.

Estimate the following to check X2 X1 P2 autoregressors:
X2 X1 P2 P1.
X2 X1 P2 P3.
Most significant autoregressor=X2 X1 P2 P3.
Does P3 meet entry requirement=No.
Least significant autoregressor=P2.
Does P2 meet stay requirement=Yes.
Best X2 X1 model=X2 X1 P2.

Estimate the following to check X2 X3 autoregressors:
X2 X3 P1.
X2 X3 P2.
X2 X3 P3.
Most significant autoregressor=X2 X3 P1.
Does it meet entry requirement=Yes.

Estimate the following to check X2 X3 P1 autoregressors:
X2 X3 P1 P2.
X2 X3 P1 P3.
Most significant autoregressor=X2 X3 P1 P3.
Does P3 meet entry requirement=Yes.
Least significant autoregressor=P1.
Does P1 meet stay requirement=No.

Estimate the following to check X2 X3 P3 autoregressors:
X2 X3 P3 P2.
Most significant autoregressor=X2 X3 P3 P2.
Does P2 meet entry requirement=No.
Least significant autoregressor=P3.
Does P1 meet stay requirement=Yes.
Best X2 X3 model=X2 X3 P3.

Estimate the following to check regressor:
X2 X1 P2.
X2 X3 P3.
Most significant X2 regressor=X3.
Does X3 meet entry requirement=Yes.
Add X3 to model.

Estimate the following to check X2 X3 X1 autoregressors:
X2 X3 X1 P1.
X2 X3 X1 P2.
X2 X3 X1 P3.
Most significant autoregressor=X2 X3 X1 P2.
Does it meet entry requirement=Yes.

Estimate the following to check X2 X3 X1 P2 autoregressors:
X2 X3 X1 P2 P1.
X2 X3 X1 P2 P3.
Most significant model=X2 X3 X1 P2 P3.
Does it meet entry requirement=No.

Estimate the following to check regressor:
X2 X3 X1 P2.
Most significant X2 X3 regressor=X1.
Does X1 meet entry requirement=No.
Do not add X1 to model.

Based upon the aforementioned analysis, the model includes the following selected regressors and autoregressors: X2, X3, and P3.

Figure 13:
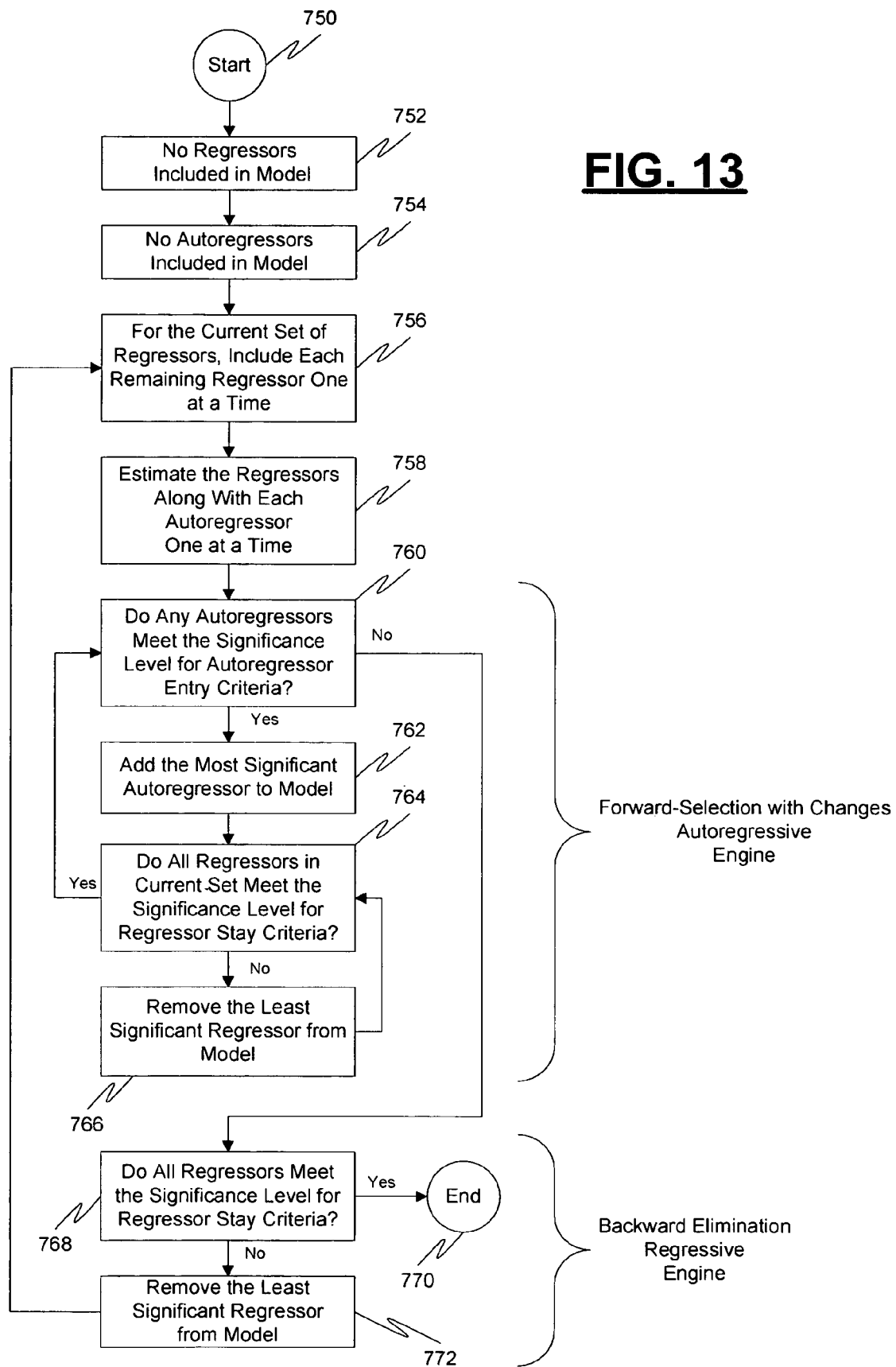
FIG. 13 is a flowchart illustrating an operational scenario wherein a forward-selection with changes technique is used to select one or more autoregressors and a backward elimination technique is used to select one or more regressors.

FIG. 13 illustrates an operational scenario wherein a forward-selection with changes technique is used to select one or more autoregressors and a backward elimination technique is used to select one or more regressors. With reference to FIG. 13, start block 750 indicates that at block 752, the model initially begins with no regressors. Block 754 indicates that no autoregressors are included in the model.

For the set of candidate regressors, process block 756 includes each regressor one at a time as follows. Process block 758 performs an estimation with the regressors along with each autoregressor one at a time. Process block 760 examines whether any autoregressors meet the significance level for the autoregressor entry criteria. If none of the autoregressors meet the significance level, then processing continues at process block 768. However if one or more autoregressors meet the significance level, then process block 762 add the most significant autoregressor to the model. Process block 764 examines whether all regressors in the current set meet the significance level for the regressor stay criteria. If the regressors do meet the significance level, then processing continues at process block 760. However if not all regressors in the current set meet the significance level, then process block 766 removes the least significant regressor from the model. Processing continues at process block 764.

When processing reaches process block 768, process block 768 examines whether all regressors meet the significance level for the regressors stay criteria. If they do, then processing for this operational scenario terminates at end block 770. However if not all regressors meet the significance level, process block 772 removes the least significant regressor from the model before processing resumes at process block 756.

As another example of a forward-selection with changes technique being used to select one or more autoregressors and a backward elimination technique being used to select one or more regressors, the following is provided. In this example, the following is assumed: Regressors (X1, X2, X3) and Autoregressors (P1, P2, P3).

Estimate the following to check X1 X2 X3 autoregressors:
X1 X2 X3 P1.
X1 X2 X3 P2.
X1 X2 X3 P3.
Most significant autoregressor=X1 X2 X3 P2.
Does it meet entry requirement=Yes.

Estimate the following to check X1 X2 X3 P2 autoregressors:
X1 X2 X3 P2 P1.
X1 X2 X3 P2 P3.
Most significant autoregressor=X1 X2 X3 P2 P3.
Does it meet entry requirement=Yes.
Least significant autoregressor=P3.
Does P3 meet stay requirement=No.
Best X1 X2 X3 model=X1 X2 X3 P2.

Estimate the following to check regressors:
X1 X2 X3 P2.
Least significant regressor=X1.
Does X1 meet stay requirement=No.
Delete X1 from model.

Estimate the following to check X2 X3 autoregressors:
X2 X3 P1.
X2 X3 P2.
X2 X3 P3.
Most significant autoregressor=X2 X3 P1.
Does it meet entry requirement=No.

Estimate the following to check regressors:
X2 X3.
Least significant term=X2.
Does X2 meet stay requirement=No.
Delete X2 from model.

Estimate the following to check X3 autoregressors:
X3 P1.
X3 P2.
X3 P3.
Most significant autoregressor=X3 P1.
Does it meet entry requirement=Yes.

Estimate the following to check X3 P1 autoregressors:
X3 P1 P2.
X3 P1 P3.
Most significant autoregressor=X3 P1 P2.
Does it meet entry requirement=Yes.
Least significant autoregressor=P1.
Does P1 meet stay requirement=Yes.

Estimate the following to check X3 P1 P2 autoregressors:
X3 P1 P2 P3.
Most significant autoregressor=X3 P1 P2 P3.
Does it meet entry requirement=No.
Least significant autoregressor=P1.
Does P1 meet stay requirement=Yes.
Best X3 model=X3 P1 P2.

Estimate the following to check regressors:
X3 P1 P2.
Least significant term=X3.
Does X3 meet stay requirement Yes.
Keep X3 in model.

Based upon the aforementioned analysis, the model includes the following selected regressors and autoregressors: X3, P1, and P2.

The disclosed systems and methods can be configured to generate predictive models for many different types of applications, such as to analyze time lags associated with time series data. A predictive model to analyze time lags can include different types of components and can resemble the following:

$$Y_t = \beta_o + \beta_{1,1}X_{1,t} + \beta_{1,2}X_{1,t-1} + \beta_{1,3}X_{1,t-2} + \ldots + \beta_{2,1}X_{2,t} + \beta_{2,2}X_{2,t-1} + \beta_{2,3}X_{2,t-2} + \ldots + \beta_{v,n}X_{v,t-k} + (e_t/(1-\rho_1 B - \rho_2 B^2 - \ldots - \rho_s B^s))$$

Where:
$BY_t = Y_{t-1}$
$B^s Y_t = Y_{t-s}$
$Y_t$: target or dependent variable.
$\beta_{v,n}$: independent variables coefficients with "n" number of them for "v" number of independent variables.
$X_{v,t-k}$: independent variables with "v" number of them at different times "t" with "k" time lags.
$e_t$: error term to model "white noise" at times "t."
$\rho_s$: autoregressive parameters with "s" of them.
B: backshift factors.

As an example of the different types of applications that can be handled, a system and method can be configured to generate predictive models for a pharmaceutical application where an analyst would like to examine the relationship between; (1) new prescription sales NRXS, (2) the number of sessions on the website N_SESSIONS, (3) the effect of advertising on the television using gross rating points GRPS, and (4) banners BANNERS which are displayed to customers visiting different websites. In this example, the data is weekly and it is thought that there may be a 'week of the month' time lag effect. To handle this approach, the model will consider up to 5 lags on the regressors and 5 autoregressive lagged parameters. This example will consider using a backward approach on the regressors and a backward approach on the autoregressive parameters. The first model is fit by regressing the number of new prescriptions NRX on: (1) the number of sessions N_SESSIONS and the 5 corresponding lags (denoted N_SESSIONS_1 ... N_SESSIONS_5), (2) the gross rating points GRPS and the corresponding 5 lags, and (3) the BANNERS and its 5 lags. This model will also be fit using an autoregressive structure that includes 5 lags, which is equivalent to including 5 lags on the response variable new prescription sales NRXS. The next step is to sequentially remove those autoregressive parameters one at a time that are not statistically significant at the significance level for stay level. It should be noted that once an autoregressive parameter is removed, the whole model is re-estimated including all the regressor variables and the autoregressive parameters. Since the autoregressive parameters are now statistically significant at the significance level for stay level, the regressor variable is checked, and any regressor variable is removed that is not statistically significant at the significance level for stay level. Once that variable is removed, then the backward approach is reapplied to the autoregressive parameters. In this example, when the autoregressive structure is correct then you test for significance on the regressor side of the equation. This process continues until all regressor variables and autoregressive parameters are statistically significant at the significance level for stay level.

The final model may look like the following.

$$NRXS_t = \beta_0 + \alpha_1 N\_SESSIONS_{t-1} + \alpha_4 N\_SESSIONS_{t-4} + \delta_0 BANNERS_t + \phi_1 GRPS_{t-1} + \phi_4 GRPS_{t-4} + \phi_5 GRPS_{t-5} + v_t$$

where $$v_t = \rho_1 v_{t-1} + \rho_4 v_{t-4} + \rho_5 v_{t-5} + \epsilon_t$$

What this model indicates is that new prescription sales this week are related to the number of people visiting the website last week and 4 weeks past, plus the number of people being referred by banner advertisements the same week, plus the effect of television advertising indicated by gross rating points lagged by weeks 1, 4, and 5. In addition, there is an effect due to autocorrelation that suggests after adjusting for these regressors and their lags, new prescription sales are also affected by new prescription sales which occurred 1, 4, and 5 weeks in the past.

A user (e.g., an analyst, business manager, software designer, etc.) may be interested in interpreting the effect of the percentage change of a regressor like BANNERS on the target new prescription sales NRXS. The elasticity of a variable can be used to describe this phenomenon. The elasticity of NRXS with respect to BANNERS can be considered as the percentage change in NRXS divided by the percentage change in BANNERS. Elasticities change when measured at different points along the regression line. Elasticities can be calculated at the point of the means of each of the independent variables. For the BANNER coefficient ($\delta_0$) the elasticity may be evaluated as:

$$E_{BANNER} = \hat{\delta}_0 \frac{\overline{BANNER}}{\overline{NRXS}} \approx \left(\frac{\partial NRXS}{\overline{NRXS}}\right) / \left(\frac{\partial BANNER}{\overline{BANNER}}\right)$$

Where $\overline{BANNER}$ and $\overline{NRXS}$ represent the mean of the BANNER and NRXS values in the data and $$\frac{\partial NRXS}{\partial BANNER}$$

represents the partial derivative of the model describing new prescriptions (NRXS) with respect to banner traffic (BANNERS).

The elasticity values can be unbounded and may be positive or negative. They can also be unit free which indicates they are independent of the units in which the variables are measured. For example, if $E_{BANNER}=5.0$, a person can say that about the mean of the variables, a 1 percent increase in banner traffic (BANNER) will lead to a 5 percent increase in new prescription sales (NRXS). Large elasticities imply that the target (NRXS) is very responsive to changes in the independent variable (BANNER).

Integrated elasticity calculations can allow for direct comparison of different media types and/or also the ability to assess the effect of percentage changes in media type relative to a target of interest like the number of patients visiting the doctor, the number of patients requesting a prescription, and the number of patients getting a new prescription filled at the drug store.

Figure 14:
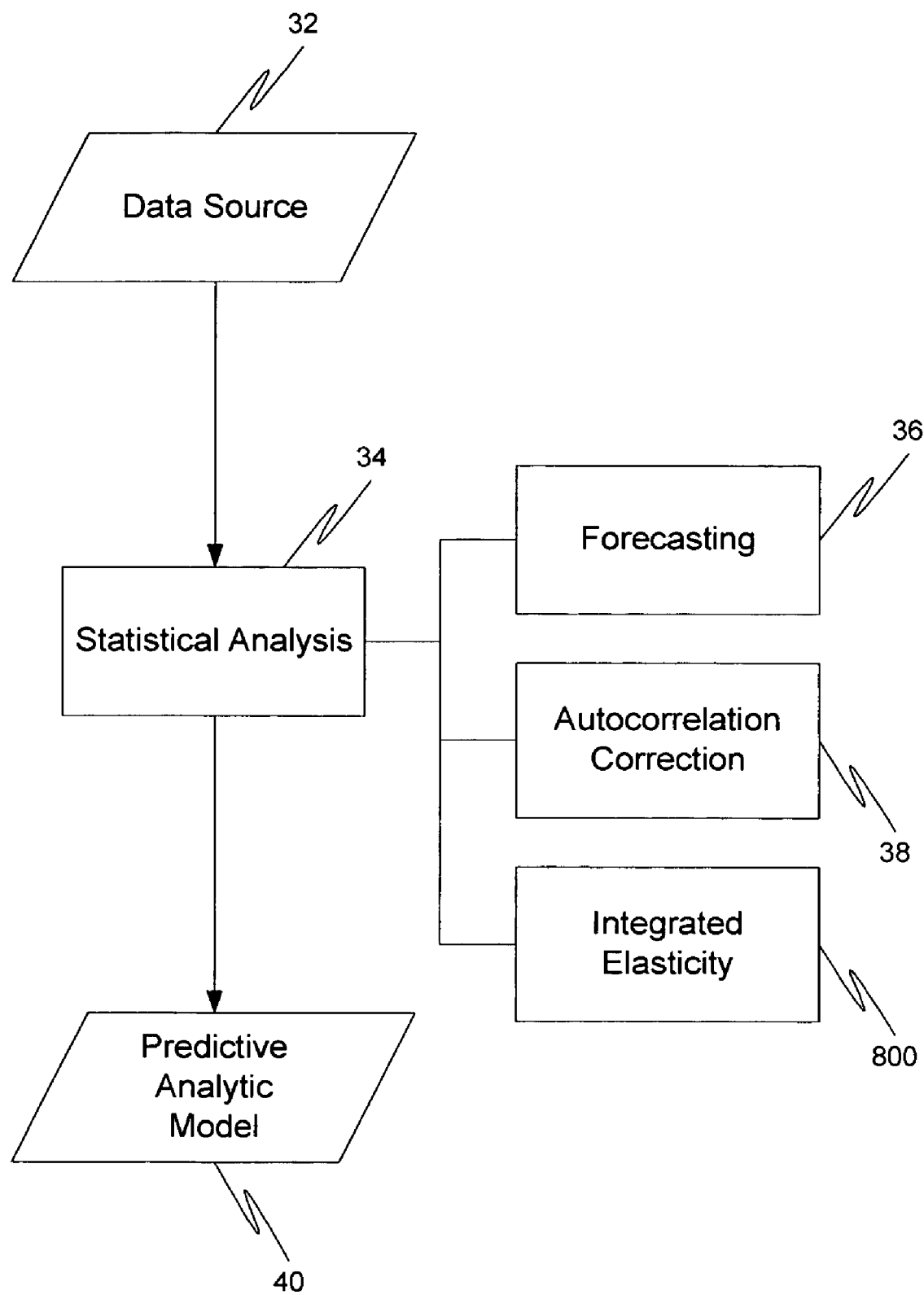
FIG. 14 is a block diagram illustrating use of integrated elasticity functionality to analyze time series data.

As an illustration, in the time series equation defined above, the regressor variable BANNER was indexed at time t ($BANNER_t$) whereas the gross rating points are indexed at time periods t-1, t-4, and t-5. The elasticity can be considered as the overall measure of effectiveness of a regressor and the measure can be used as a yardstick for return on investment (ROI). As shown in FIG. 14, a system can be configured with integrated elasticity functionality 800 to allow for measuring the overall effectiveness for factors that include lagged effects. Computationally the factors may be calculated as:

$$IE_{GRPS} = (\hat{\varphi}_1 + \hat{\varphi}_4 + \hat{\varphi}_5) \frac{\overline{GRPS}}{\overline{NRXS}}$$

for GRPS.

Because the means of GRPS for lags 1, 2, and 5 are very close to the overall mean you can add up the coefficients for the lags and multiply by the appropriate mean for the regressor divided by the mean for the target.

While examples have been used to disclose the invention, including the best mode, and also to enable any person skilled in the art to make and use the invention, the patentable scope of the invention is defined by claims, and may include other examples that occur to those skilled in the art. For example, the systems and methods disclosed herein may be used in many different types of applications, such as analyzing time series data for pharmaceutical, retail and financial companies.

As another example, a system and method can be configured as disclosed herein such that use of autocorrelation correction operations can result in improved or correct calculations for R-squares, t-tests, and p-values and can provide reliable estimates for advertising factors. Also, the operations can permit combining individual media factor coefficients at different lags so as to provide a methodology to assess and compare different types of media. Also, the ability to combine coefficients for different lags of the same media type may be performed using integrated elasticity calculations.

As yet another example, a system and method can be configured to quickly generate results that correct for autocorrelation, such as in an ASP (application service provider) environment, where typically there might be a tight time window (e.g., a 12-hour window) to update results. Such a system and method can be used in place of a traditional statistical procedure that does not correct for autocorrelation effects and so may produce incorrect R-squares, parameter standard errors, t-tests on the parameters, and p-values. Such a system and method may also be used in the place of a traditional procedure that (although the traditional procedure may estimate and forecast linear regression models for time series data and use an autoregressive error model to correct for autocorrelation) still produces incorrect results (e.g., error term is autocorrelated, the efficiency of the Ordinary Least-Squares (OLS) parameter estimate is adversely affected and the standard error estimates are biased). Incorrect results for the traditional procedure can be still generated, at least in part, because the traditional procedure's error model can be over-parameterized and thus may introduce many biases due to having too many insignificant components.

It is noted that the systems and methods may be implemented on various types of computer architectures, such as for example on a single general purpose computer or workstation, or on a networked system, or in a client-server configuration, or in an application service provider configuration.

It is further noted that the systems and methods may include data signals conveyed via networks (e.g., local area network, wide area network, internet, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform methods described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context clearly dictates otherwise; the phrase "exclusive or" may be used to indicate situation where only the disjunctive meaning may apply.

It is claimed:

1. A computer-implemented method for determining a parametric model to process time series data with respect to regressor components and autoregressive components, comprising:

receiving time series data;

performing a first stepwise statistical technique upon autoregressive components using the time series data and determining significance level of an autoregressive component while performing the first stepwise statistical technique;

performing a second stepwise statistical technique upon regressor components using the time series data and determining significance level of a regressor component while performing the second stepwise statistical technique;

including, in a parametric model, autoregressive and regressor components based upon the autoregressive and regressor components' significance levels;

providing as output the parametric model that contains the autoregressive and regressor components that were included based upon the autoregressive and regressor components' significance levels;

wherein the parametric model is a predictive model of the time series data and adjusts for autocorrelation in the time series data.

2. The method of claim 1, wherein the first and second stepwise statistical techniques include stepwise regression techniques;

wherein the stepwise regression techniques include a technique selected from the group comprising: a forward selection regression technique and a backward elimination regression technique.

3. The method of claim 1, wherein the first and second stepwise statistical techniques include stepwise regression techniques;

wherein the stepwise regression techniques include a technique selected from the group comprising: a forward selection regression technique, a backward elimination regression technique, and a forward-selection with changes regression technique.

4. The method of claim 3, wherein multiple parametric models are automatically generated by using different permutations of the group's stepwise regression techniques upon the autoregressive components and the regressor components;
wherein the generated parametric models are predictive models of the time series data and adjust for autocorrelation in the time series data.

5. The method of claim 1, wherein autocorrelation is measured during the first and second stepwise statistical techniques;
wherein because of the measurement of the autocorrelation and the adjustment for autocorrelation, the parametric model improves accuracy with respect to R-squares, t-tests, and p-values associated with use of the parametric model.

6. The method of claim 1, wherein the first and second stepwise statistical techniques permit combining individual factor coefficients at different lags;
wherein coefficients are combined for different lags of the same variable type by using integrated elasticity measurement;
wherein the integrated elasticity measurement includes assessing effect of percentage change in a dependent variable relative to an independent variable.

7. The method of claim 6, wherein a first integrated elasticity measurement is larger than a second integrated elasticity measurement;
wherein the larger first integrated elasticity measurement indicates the dependent variable of the first integrated elasticity measurement is more responsive to changes in the independent variable of the first integrated elasticity measurement than is the dependent variable of the second integrated elasticity measurement relative to changes in the independent variable of the second integrated elasticity measurement.

8. The method of claim 1, wherein a list of candidate autoregressive components and regressor components are provided;
wherein the first stepwise statistical technique is performed upon the candidate autoregressive components using the time series data and determining significance level of an autoregressive component while performing the first stepwise statistical technique;
performing a second stepwise statistical technique upon the candidate regressor components using the time series data and determining significance level of a regressor component while performing the second stepwise statistical technique.

9. The method of claim 1, wherein the regressor and autoregressive components include components selected from the group comprising variables and parameters.

10. The method of claim 1, wherein forecasting is performed upon the included autoregressive and regressor components in order to generate the parametric model.

11. The method of claim 1, wherein source of the time series data is a data warehouse; wherein a data mining module performs the steps of claim 1.

12. The method of claim 1, wherein the autoregressive components used for the first stepwise statistical technique is from a candidate set of autoregressive components;
wherein the regressor components used for the second stepwise statistical technique is from a candidate set of regressor components.

13. The method of claim 1, wherein the autoregressive and regressor components included in the parametric model are for use in analyzing time lags associated with the time series data.

14. The method of claim 13, wherein the parametric model includes an independent variable $Y_t$;
wherein $Y_t$ is expressed as:

$$Y_t = \beta_0 + \beta_{1,1}X_{1,t} + \beta_{1,2}X_{1,t-1} + \beta_{1,3}X_{1,t-2} + \ldots + \beta_{2,1}X_{2,t} + \beta_{2,2}X_{2,t-1} + \beta_{2,3}X_{2,t-2} + \ldots + \beta_{v,n}X_{v,t-k} + (e_t/(1-\rho_1 B - \rho_2 B^2 - \ldots - \rho_s B^s));$$

wherein $BY_t = Y_{t-1}$;
wherein $B^s Y_t = Y_{t-s}$;
wherein $Y_t$ represents a target or independent variable;
wherein $\beta_{v,n}$ represents independent variables coefficients with "n" number of them for "v" number of independent variables;
wherein $X_{v,t-k}$ represent independent variables with "v" number of them at different times "t" with "k" time lags;
wherein $e_t$ represents an error term at different times "t";
wherein $\rho_s$ represents autoregressive parameters with "s" of them;
wherein B represents backshift factors.

15. The method of claim 14, wherein at least one of the $X_{v,t-k}$ terms is not used to express the independent variable because the coefficient of said $X_{v,t-k}$ term has a value of approximately zero.

16. A data signal that is transmitted across a network, wherein the data signal includes the parametric model of claim 1.

17. Computer-readable medium capable of causing a computing device to perform the method of claim 1.

18. A memory that stores a parametric model to process time series data with respect to regressor components and autoregressive components, wherein the parametric model was constructed based upon a method comprising:
receiving time series data;
performing a first stepwise statistical technique upon autoregressive components using the time series data and determining significance level of an autoregressive component while performing the first stepwise statistical technique;
performing a second stepwise statistical technique upon regressor components using the time series data and determining significance level of a regressor component while performing the second stepwise statistical technique;
including, in a parametric model, autocorrelation and regressor components based upon the autocorrelation and regressor components' significance levels;
providing as output the parametric model that contains the autoregressive and regressor components that were included based upon the autoregressive and regressor components' significance levels;
wherein the parametric model is a predictive model of the time series data and adjusts for autocorrelation in the time series data.

19. A computer-implemented system for determining a parametric model to process time series data with respect to regressor components and autoregressive components, comprising:
first computer instructions configured to perform a first statistical technique upon autoregressive components using time series data and to determine significance level of an autoregressive component while performing the first statistical technique;

second computer instructions configured to perform a second statistical technique upon regressor components using the time series data and to determine significance level of a regressor component while performing the second statistical technique;

wherein autoregressive and regressor components are included in the parametric model based upon the autoregressive and regressor components' significance levels;

third computer instructions configured to provide as output the parametric model that contains the autoregressive and regressor components that were included based upon the autoregressive and regressor components' significance levels;

wherein the parametric model is a predictive model of the time series data and adjusts for autocorrelation in the time series data.

20. The system of claim 19, wherein the time series data contains a sequence of observations related to an advertising activity;

wherein the parametric model is a predictive model for use in analyzing the advertising activity and adjusts for autocorrelation in the time series data which is related to the advertising activity.

* * * * *